US012764040B2

(12) United States Patent
Hardy et al.

(10) Patent No.: US 12,764,040 B2
(45) **Date of Patent: *Oct. 13, 2026**

(54) NETWORK MANAGEMENT SYSTEM FOR SOFTWARE DEFINED RADIO NETWORKS FOR USE IN MOBILE NETWORKS

(71) Applicant: Anuvu IP Holdings LLC, Santa Ana, CA (US)

(72) Inventors: Graeme Hardy, Los Angeles, CA (US); Claudio Vignali, Huntington Beach, CA (US); Jay Lorenzana, Wheaton, IL (US); Parva Bhayani, Lombard, IL (US); Steve Redford, Naperville, IL (US); Kuan Chin, Las Vegas, NV (US); Steve Tucker, Naperville, IL (US); Simon McLellan, Canyon Lake, IL (US); Scott Kamara, Lisle, IL (US)

(73) Assignee: Anuvu IP Holdings LLC, Santa Ana, CA (US)

( * ) Notice: Subject to any disclaimer, the term of this patent is extended or adjusted under 35 U.S.C. 154(b) by 572 days.

This patent is subject to a terminal disclaimer.

(21) Appl. No.: 18/365,847

(22) Filed: Aug. 4, 2023

(65) Prior Publication Data

US 2024/0048458 A1 Feb. 8, 2024

Related U.S. Application Data

(60) Provisional application No. 63/480,744, filed on Jan. 20, 2023, provisional application No. 63/395,078, filed on Aug. 4, 2022.

(51) Int. Cl.
*H04L 41/40* (2022.01)
*H04B 7/185* (2006.01)

(52) U.S. Cl.
CPC ......... *H04L 41/40* (2022.05); *H04B 7/18513* (2013.01)

(58) Field of Classification Search
CPC ...... H04L 41/40; H04L 7/18513; H04L 41/16
See application file for complete search history.

(56) References Cited

U.S. PATENT DOCUMENTS 5,926,745 A * 7/1999 Threadgill ......... H04B 7/18578 455/12.1
6,636,721 B2 * 10/2003 Threadgill ......... H04B 7/18539 455/12.1

(Continued)

*Primary Examiner* — Mahran Y Abu Roumi
(74) *Attorney, Agent, or Firm* — SoCal IP Law Group LLP; Jonathan Pearce; Angelo J. Gaz

(57) ABSTRACT

The present disclosure relates to a software defined radio for a mobile network system including a plurality of satellite transponders, each satellite transponder operating using single channel per carrier (SCPC) transmission to allocate an entire bandwidth of a given frequency channel of a plurality of channels to the network management system, at least one ground station in communication with the plurality of satellite transponders, the at least one ground station communicating on at least one of the plurality of channels, using the plurality of satellite transponders, to a remote host, and a management server, that sets a bandwidth available for a particular channel of the plurality of channels at a predetermined maximum and dynamically adjusts the bandwidth allocated to a particular channel of the plurality of channels based upon a present determination of a utilization of the particular channel of the plurality of channels.

18 Claims, 8 Drawing Sheets

© 2023 Anuvu IP Holdings LLC

(56) References Cited

U.S. PATENT DOCUMENTS

| | | | | |
|---|---|---|---|---|
| 10,209,159 | B2 * | 2/2019 | Fujisawa | G01M 5/0041 |
| 2004/0092263 | A1 * | 5/2004 | Parkman | H04B 7/18541 455/436 |
| 2005/0013384 | A1 * | 1/2005 | Gregoire | H03F 1/3247 375/296 |
| 2005/0037706 | A1 * | 2/2005 | Settle | H04B 7/18526 455/12.1 |
| 2008/0212518 | A1 * | 9/2008 | Wells | H04B 7/18582 370/316 |
| 2014/0119385 | A1 * | 5/2014 | Hoffmeyer | H04B 7/18515 370/474 |
| 2017/0141834 | A1 * | 5/2017 | Yang | H04B 7/0473 |
| 2018/0098247 | A1 * | 4/2018 | Gopal | H04B 7/18519 |
| 2019/0028185 | A1 * | 1/2019 | Tomasicchio | H04B 7/0408 |
| 2021/0391920 | A1 * | 12/2021 | Calder | H04L 27/2649 |
| 2023/0356693 | A1 * | 11/2023 | Yoshida | B60R 25/245 |

* cited by examiner

© 2023 Anuvu IP Holdings LLC

© 2023 Anuvu IP Holdings LLC

© 2023 Anuvu IP Holdings LLC

© 2023 Anuvu IP Holdings LLC

© 2023 Anuvu IP Holdings LLC

© 2023 Anuvu IP Holdings LLC

© 2023 Anuvu IP Holdings LLC

© 2023 Anuvu IP Holdings LLC

NETWORK MANAGEMENT SYSTEM FOR SOFTWARE DEFINED RADIO NETWORKS FOR USE IN MOBILE NETWORKS

RELATED APPLICATION INFORMATION

This patent claims priority from U.S. Provisional patent application No. 63/395,078, titled, SOFTWARE DEFINED NETWORK FOR MOBILE SATELLITE DATA COMMUNICATION, filed Aug. 4, 2022 and claims priority from U.S. Provisional Patent Application No. 63/480,744, titled, NETWORK MANAGEMENT SYSTEM FOR MOBILE SATELLITE DATA COMMUNICATION, filed Jan. 20, 2023, all of which are hereby incorporated by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to network management systems and more particularly to a network management system for satellite networks used in mobile operations.

Description of the Related Art

There exist various systems for providing mobile vehicles with internet and data connectivity in a mobile network system having mobile network hosts. In a simplified form of such a mobile network, a mobile base station is taken to a particular location, setup, connected to a satellite, and begins receiving and/or broadcasting on a given channel or frequency. One example of such a system is a hot-spot style cellular telephony system that is taken to a particular location, such as a football game or large outdoor concert, when high network utilization is expected. Another example is a VSAT connection used beginning in the late 70s for connecting remote television broadcast crews with a live television station so that on-the-street broadcasts can occur. However, those systems all require that the hub through which the data is passing be "set up" and generally to remain in a fixed location.

Military systems have existed for some time—some of which were capable of sending traditional TCP and/or IP traffic, but were generally designed to be party-to-party communications systems for operational use in the military.

Over the last ten years or so, customers have demanded, and businesses have responded by providing, mobile connectivity on planes and aboard ships. Providing connectivity on land-based mobile platforms (e.g., trains or cars) has been relatively straightforward. In most cases, mobile telephony reliant upon 4G or 5G (and so on) technology is sufficient for those purposes. But, for planes and aboard ships, the significant issue is that there is no "ground" below the mobile platforms to which to connect for data backhaul. Despite this, some plane-based systems rely upon ground-based platforms and merely do not work over water.

In response to this issue, most plane and shipboard systems rely upon satellite communications. In a simplified sense, satellites are merely systems for "bouncing" a particular signal to a given footprint (on the Earth) covered by the satellite. They act effectively as repeaters of a given set of data that they receive. But, a significant drawback of satellite communications for use in internet applications is that the roundtrip communication takes approximately 1 second from ground to satellite to remote location and then back. This is a significant lag which impedes moment-to-moment performance. In addition, it makes transitioning between satellites take potentially tens of seconds of time. The associated internet connectivity feels "sluggish" and nonresponsive to users. Even that is assuming almost perfect reception of data. If data is lost, the response times become terrible. The goal is simply to provide a consistent, strong and responsive wireless internet signal (and other data if desired) for the passengers aboard.

In general, these systems rely upon the service providers purchasing access to one or more transponders on series of satellites with overlapping terrestrial footprints (e.g., the terrestrial area that is serviced by the given satellite). The term "terrestrial" as used herein means fixed and ground-based or based upon the earth which could be on or over the ocean on the earth as well. Then, ground-based stations may transmit to and receive signals to the satellite(s) that may be relayed to remote stations on board planes and ships and other mobile platforms.

In the process of obtaining and maintaining a signal from a given satellite, shipboard or airborne antennas generally must be "aimed" at a desired satellite, and then tracked to maintain a high-quality signal from the satellite. Otherwise, data can be lost. The process of aiming the antenna is called "acquisition" of the satellite signal. The initial acquisition is not of much concern because no one is using the associated wireless network before signal is acquired. However, once the signal is acquired, planes and ships can pass from one footprint to another, requiring a transition in the signal and re-acquisition or simply acquisition of a signal from the new satellite.

That re-acquisition process can take time. During that time, the internet connectivity becomes unavailable. There is also potential for errors in the transition that force the antenna back to the original source if acquisition experiences an error.

Because these satellite connections are extremely expensive to lease, providers are strongly incentivized to devise schemes for most-efficiently allocating the available (e.g., leased) bandwidth on a given satellite or set of transponders. Typically, these satellites rely upon the C band (frequency range 4-8 Ghz, wavelength range 7.5-3.75 cm), $K_u$ band (frequency range 12-18 Ghz, wavelength range 2.5-1.67 cm) and Ka band (frequency range 20-30 GHz). Typically, C band satellites have 24 transponders, while Ku band satellites have 32 and $K_u$ band may have over 100. In short, they are a limited resource.

One method for intelligently allocating the available bandwidth on these satellites is to employ multiplexing of some kind. The preferred method for most satellite broadcasters is time-division multiplexing (TDM), in satellites, the preferred method is called time-division multiple access (TDMA). Under TDMA, a given channel is sub-divided by time such that multiple communicators on that channel can utilize the channel (and the entire available bandwidth of the channel) for a given sub-set of time.

In essence, the data stream (e.g. the return channel from the remote terminal to a terrestrial ground station) is divided into a series of time periods during which a given user may "speak." The size of those time periods may be varied if a given users requires more bandwidth overall than another user. The entire data stream is broadcast to everyone who is in the line of sight of the satellite, but the receiving stations (ground or otherwise) need only pay attention to data that is "flagged" as relevant for that receiver. In this way, the entire channel's bandwidth may be used at any given moment, but by a succession of broadcasters/receivers on that channel.

Several downsides exist in the use of TDMA: It requires a not-insignificant amount of setup and management to ensure that it operates appropriately. This includes very specific timing to ensure the burst arrives at the ground within the correct timing window and a very accurate frequency calculation using doppler correction to ensure the burst is very close to the expected receiver center frequency for immediate lock. Everyone on the channel must know when it is supposed to talk within a very specific time window. That timing window will vary due to the dynamic location of the terminal and when using inclined satellites that also move significantly. The ground receiver must also allow larger that needed timing windows to guard against inaccuracies in timing calculations that are significant in a fast-moving terminal (such as an aircraft) utilizing inclined satellites. These larger timing windows reduce the overall useable bandwidth in the return channels and therefore reduce the overall channel efficiency. These factors also become important when the terminal needs to switch to a new satellite or network as it takes time for the remote terminal to calculate the timing factors These calculations and coordination make the channel setup slower, and adds significant time in acquisition and re-acquisition in a transition between satellites as a mobile platform moves.

Figure 1:
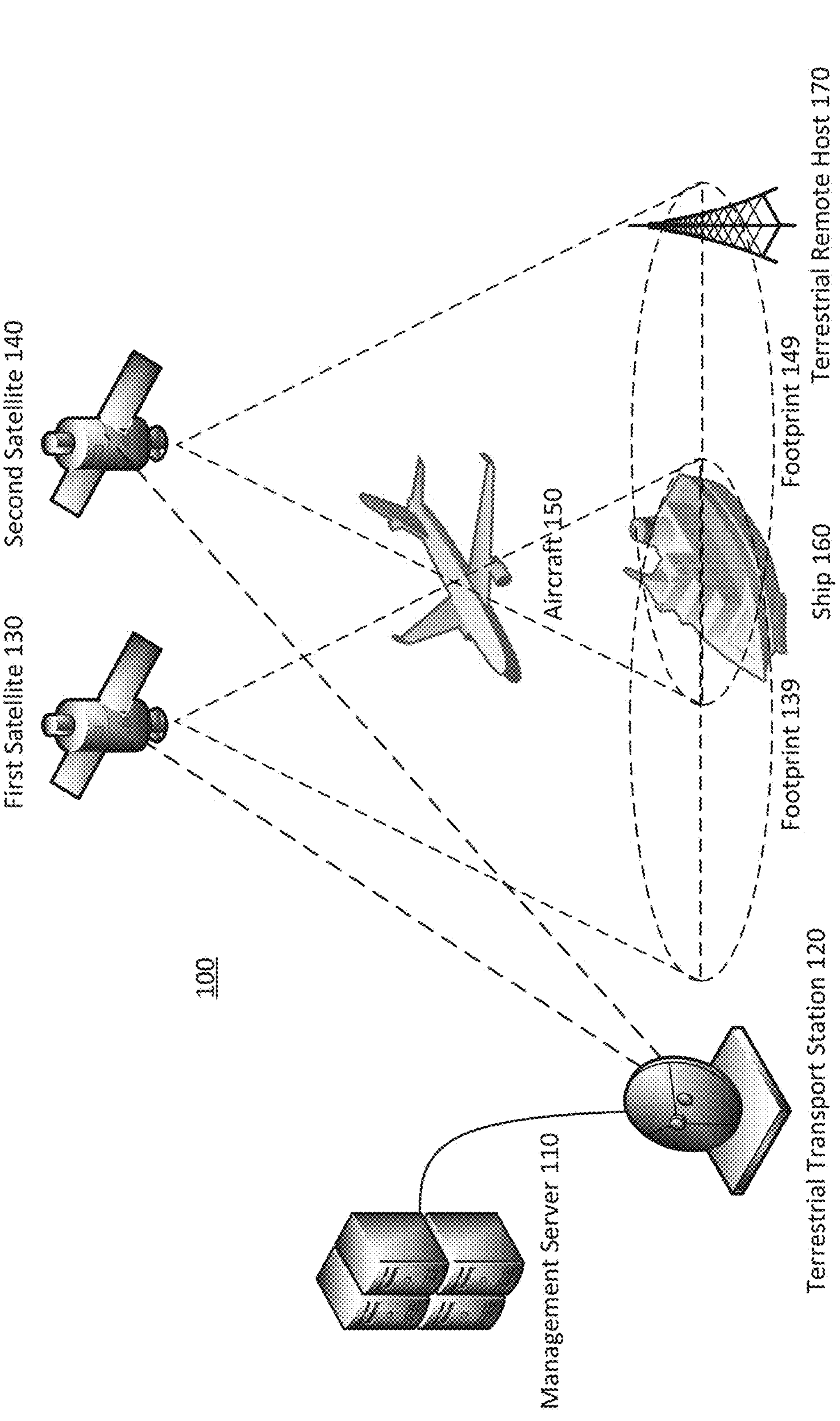
FIG. 1 is an overview of a network management system 100 for use with a software defined radio for a mobile network system.

Throughout this description, elements appearing in FIGURES are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

In contrast to prior art time-division multiple access (TDMA) systems which rely upon time windows for broadcast to enable multiple network members to communicate using a single channel, a single channel per carrier (SCPC) system as used herein enables a single channel to be used entirely by one receiver/broadcaster pair (e.g. a terrestrial station and a mobile remote host). This results in the use of significantly more bandwidth as the entire channel is always used by the single pair. There is potential for wasted bandwidth if the channel is too broad and bandwidth remains unused for a long period of time. Because SCPC allocates an entire channel to a receiver/broadcaster pair, it has typically been used with extremely narrow bands of bandwidth for point-to-point communications such as voice data communications or point-to-point radio frequency communications that rely upon limited data throughput or a large aggregated data flow that has more of a deterministic flow.

The SCPC connection relies upon a selected frequency/channel and transmission of data can, therefore, begin immediately upon a transition. There is no need to fit data within a specific time slot or window. And, because the entire channel is used, the receiving antennae can simply listen and adjust in real-time to better-tune to the data being sent on the associated channel/frequency. TDMA typically requires the pre-test data, determination of Doppler shift and careful setup of the channel because the listen window is so short, the data can be missed if things are not properly calibrated before the handoff.

However, a software definable radio (SDR) wherein channel allocations are automatically managed using load management systems can address most of the above concerns usually associated with SCPC connections. So, a given channel may be sized to the very smallest possible bandwidth if the data being used is little or may be increased in size dynamically (e.g., increasing the bandwidth or frequencies used or adding transponders for still more channels) if data use has grown or growth is expected.

In addition, the added layer of SDR enables the system to quickly handle handoffs between overlapping satellite footprints. In particular, the handshaking required for TDMA networks is eliminated because a ground-based SDR management system can allocate channels, inform each antenna device which channel has been allocated for that antenna before it begins the transition to a new satellite. As a result, there can be virtually no handshake process, other than setting up typical TCP/IP connections and the data stream is virtually uninterrupted. It has been experienced that the entire transition is less than two seconds, usually less than four hundred milliseconds.

Using TDMA, the transition and handshaking process can take between six to twenty seconds dependent on many factors. One of the most time consuming is the use of time windows for broadcasting, and timing the receiver to listen at the appropriate time due to Doppler shift of the transmitted signal. This process typically requires a "test" signal be sent in the first available time window, an adjustment, then beginning the broadcast itself. That process can take many seconds to complete, depending on how many receiver/transmitter pairs are reliant upon the TDMA-configured satellite.

The overall system to implement this type of connection may include three parts: the software defined radio (SDR) network, a dynamic network management system (NMS) for allocating channels, and dynamic data flow management provided by the NMS.

Software Defined Radio (SDR)

As discussed somewhat above, SDR enables the system to be nimble by dynamically allocating and deallocating data channels in real-time. This is because the channels are not fixed per receiver-broadcast pair, such as for a given aircraft broadcaster to a ship receiver. Where in prior art systems all planes within a footprint could be allocated to one or more channels, then would handshake and share access to those allocated channel(s) using TDMA, now, individual channels can be defined on an as-needed basis for each plane using SCPC. When those channels are no longer in use, they can be returned to an available pool of empty channels or reallocated to another plane, ship, or mobile platform.

These modems used by the SDR provide high throughput (+500 Mbps) and DVB-S2X capabilities but also supply the dedicated channels between the aircraft and the ground (receiver and transmitter pairs, who each send and receive data using a satellite). These channels are agile in bandwidth and frequency and apart from a minimal set of default channels used for initial system initialization and control (as is typical with SCPC), all are allocated and deallocated in real time as needed.

These dedicated channel features simplify network design as they remove a lot of complexities such as doppler shift and distance to satellite calculations that are critical in a time-slot based system but are actually immaterial under and SCPC/SDR system. These features allow a sub-millisecond acquisition time with seamless transfers and handoffs that are critical for supporting such a fully dynamic system. In particular, with TDMA networks, there is a necessary hand-off process and reacquisition process when transitioning between satellites that takes significant time. The SDR ends this necessary handshake, reliant upon single channel per carrier (SCPC) connections in place of TDMA.

In part, this is because TDMA sends data in bursts, then stops, for a given "listener." This delay in chunks of data can cause the initial acquisition to take some time to complete. The problem is that it is necessary to know where the aircraft is located so as to accurately transmit data to an aircraft at the right time (e.g., the "time" in time division multiple access). This transmission can be fine-tuned over a few seconds, or tens of seconds. The system previously had to take into account doppler shift to have the frequency adjusted to a given transceiver. And, in the past, bursts of data and response have been used to do this initial setup to get the TDMA setup appropriately.

The use of SCPC significantly diminishes all of those issues because a constant data stream is broadcasting (receiving) from the satellite at all times as set by the NMS (discussed below). That steady, stream of signal can be acquired remarkably quickly, even while a plane, ship, or other mobile platforms are in motion.

Network Management System

A network management system (NMS) for use with a software defined radio (SDR) for a mobile network system of an SCPC can have a management server for setting a bandwidth available for a particular channel of at a predetermined maximum, and dynamically adjusting the bandwidth allocated to the particular channel and assigning each channel used by a satellite and transmitter/receiver pair based upon a present determination of a utilization of the particular channel of the plurality of channels.

The ability for SDR to dynamically allocate channels using SCPC enables the use of an intelligent network management system. For example, for a single plane or ship within a given satellite's footprint, the SDR is aware of at least: the available bandwidth (channels×bandwidth per channel) within the footprint, location within the footprint (e.g., edge or center) of each remote host, availability of other footprints and their relationship to location of each remote host, the expected needed bandwidth for that ship or plane, the actual, current bandwidth being used by the ship or plane, the presence of other ships or planes within the footprint, the available ground transponders and satellite transponders (there is a one-to-one ratio necessary to support bringing a new channel onboard), whether a particular data set or system in a given footprint is of a particularly high priority (VIP, military, etc.), expected future bandwidth needs for the ship or plane, and expected future or current bandwidth needs of other planes or ships within the footprint.

The NMS well may potentially rely upon machine learning to predict the needed bandwidth and channels for a given ship or plane or group of ships or planes based upon other data available (e.g., how booked a flight/cruise is, the time of day or night, any activities taking place on the ship or plane, and other historical data like that discussed above). There may be still other data inputs like severe weather or proximity to ground-based data access (e.g., cellular data) taken into account. Such a system may utilize machine learning in whole or in part to make decisions regarding allocation of bandwidth (e.g., the channel or channels to dedicate to a given mobile platform). These data may be used as training data for a machine learning, neural network or artificial intelligence model or engine.

Using this data/information, and associated information as it pertains to every ship, plane, or other mobile platform within a given satellite footprint (or multiple in the case of overlapping footprints), the NMS can make very intelligent and minute-to-minute decisions about the allocation of available channels for each ship, plane, or mobile platform. As it grows later and later in the night, the multi-channel connection provided to a cruise ship may slowly be de-allocated either (1) in response to data indicating that a given channel is going largely unused or (2) preemptively based upon the expectation that the data will be used less and less throughout the night as individuals go to sleep.

Similarly, as a new plane transitions from one footprint to another footprint, the SDR may deallocate the channel within the previous footprint, and may allocate a new channel in the new footprint, while communicating the new channel and antenna acquisition data to the antenna system. In addition, there may be, for example, 10 planes operating within that footprint, each reliant upon the available frequency to access data. The SDR may previously have allocated a larger channel per plane. Now that a new plane is entering the footprint, the NMS may direct the SDR to allocate smaller channels per plane to accommodate the new plane entering the footprint. The reverse is also true when a plane exits the footprint, wider channels can be immediately allocated to increase bandwidth to the remaining planes.

A constant adjustment can take place with the orchestration of the various systems here to manage data throughput as best as is possible for all mobile devices within a given footprint. And, as a plane or ship or mobile platform moves from one footprint to another and to another, the system may dynamically de-allocate bandwidth (e.g., channels) previously used for one mobile platform in advance of that transition so that the bandwidth may be available for the ship, plane or other mobile platform when it does transition between footprints. Realistically, there is some overlap, so the transitions can happen as the ability of one footprint to reach a given mobile platform begins to wane, while another waxes.

Data Flow Management

The NMS can react to data needs in real time. Multiple channels on a given transponder can be allocated to a given plane, ship, or other mobile platform. Or, a single channel may be allocated. This enables the system to wield relatively tight controls over the allocation of data and increases efficiency. The only requirement is more "backend" orchestration of these channels that is happening in real-time. Using TDMA enables the ground station to simply allocate those times for broadcast, but the devices receiving the data are relegated to waiting for "their" data and have limited control on the channels or bandwidth allocated to them. As a result, the use of SCPC is much more dynamic, responsive and deterministic to real-time data needs.

This data flow management helps to ensure that transmission and reception buffers are kept short (unlike TDMA), and latency can be kept to a minimum because the network's utilization and availability are actively being monitored. The data flow management will actively manage user flows and sessions by managing the TCP layer to the user. Buffering the data increases latency by delaying traffic, so the data flow management is designed to exactly match the size of the channel to prevent underflow or overflow of the short buffers. This is a key feature of the system that integrates the user flow management to the dynamically allocated channel bandwidth. If latency becomes high, then that means data throughput is higher. If latency is extremely low, then that means the channel is likely not being utilized and should be decreased or channels should be removed and reallocated to others. Buffers are used only for error checking and to ensure receipt of transmitted data.

In addition, data flow management can prioritize particular types of data over others. For these mobile applications, it is preferrable that users do not take up significant bandwidth for long periods of time (e.g., streaming a movie on a video streaming service) because that dominates the data available for other users and degrades overall experience for other users. So, the data flow management can be utilized to prioritize smaller data sets (or just particular data sets or prioritized data sets or users) over others. That way, a user sending an email or merely web browsing can have their data set at a higher priority level than those streaming movies or downloading a large operating system update.

Quality of Service (QoS) flags have been used by some data transmission systems to prioritize streaming-related data. It is a bit of a "hack" or work-around to ensure that streaming of video data is prioritized and delivered. The reverse can be employed by the data flow management system within the present system. Instead, deep packet analysis can be employed to attempt to categorize data sets. In a simplified form, even destination routing can be used to determine a likely type of data (e.g., data going to mail.google.com is probably an email, whereas data coming from Netflix® streaming servers is probably a video stream). Regardless of how a data type is determined, data that is almost certainly video streaming data or large size data transmissions (e.g., Windows® update downloads occurring in the background) can be deprioritized, having their QoS flags set lower on purpose, by the routing infrastructure, than other data types. This ensures that the high-bandwidth but non-critical data types are given a back seat to data that the wireless network wants to prioritize and ensure that is sent and received in a timely fashion.

The end-user's overall experience of this system is faster bandwidth, that is more dynamically responsive to the immediate needs of the aircraft, ship or other mobile platform. And, acquisition and reacquisition in a transition both occur much faster than under previous systems. Overall, it is a net improvement with low impact on necessary hardware, but some significant management on the ground-based SDR and NMS used by the operator.

In concert, the entirety of this system relies upon a number of components working in harmony. The modem parameters (e.g., channels and general location of satellite signals to acquire and bandwidth allocated) must be dynamically controllable at an extremely low latency for reaction times to enable fast acquisition as data transmission (and reception on the mobile platform) transitions from a first satellite to a second satellite. In addition, defining the throughput using Dynamic SCPC, as opposed to traditional TDMA modulation, enables a defined throughput to be managed (e.g., the "size" of the channel(s) being used) which enables the system to rely upon flow control and even managing the size of the channel(s) to adequately utilize those channels. In the absence of dynamic sizing for those channels, the system would have mobile platforms significantly under-utilizing their bandwidth and other mobile platforms "starved" for bandwidth. The entire system working on concert is necessary to enable the fast acquisition, dynamic bandwidth options, and flow management described herein.

Network Resource Management

The use of wide area networks, typically using satellite and ground links, but also using terrestrial connections introduces a number of issues from bandwidth limitations to latency issues. Some of those issues can be readily addressed by active and unique strategies for network resource management. Each of the issues and some responsive network resource management processes are discussed in turn below.

Application Performance Enhancing Technology

Network traffic may be prioritized using priority queues. So, for example, on a shipboard or long-haul aircraft network, total bandwidth available may be limited. In such cases, a better user experience may result if "new" connections to the network are prioritized over older or long-term connections. From a user perspective, a "new" connection is a user who has just connected to a wireless network (or other network) on the ship or aircraft. That user may have a particular task that needs to be accomplished and, thereafter, may disengage. That user's experience is significantly enhanced if the network is responsive and available to that user during that short use cycle.

Other users may have processes that are engaged for extended periods of time. This may be large file downloads, ongoing reporting connections (e.g. information provided by a ship to a ground station related to the ongoing cruise), or a streaming session that takes hours for a movie to complete. Those users may have a lower priority than the new users as those users continue to use bandwidth for long periods of time. Both as a subtle reminder to cease heavily using the network by those users and as a mechanism for fairly allocating network resources, a priority queue system may be implemented for network traffic.

This priority queue may rely upon quality of service (QoS) systems to prioritize certain traffic, or may be implemented as merely a traffic queue through the use of an intelligent traffic prioritization engine. The engine may note the source and destination of network traffic and may apply a weighting system to enable more packets from a set of packets for a given "new" user through the limited bandwidth connection (e.g. satellite connection totaling 30 Mb/s). Longer term users may be allowed fewer packets in a given time slice. So, for example, of ten packets for a "new" user and ten packets for a longtime user of the network, 8 packets may be passed through the queue to the network for the new user, while only 3 are passed through to the network for the longtime user. A "new" user may be a user connected to the network (or sending data on the network over a predetermined threshold of data) for more than a few minutes or thirty minutes.

The prioritization may be implemented as a queue that handles all traffic and prioritizes based upon the desired characteristic.

A related prioritization queue could also or instead weight traffic by traffic-type. So, for example, email traffic or text message traffic (Apple® Messages, etc.) and ordinary web browsing could be prioritized as the highest-level priority while internet streaming from certain sites may be lower priority. If bandwidth is readily available, it may have no prioritization applied, but if there are network bandwidth constrains, then the priority or traffic-type queues could be implemented in software operating on a server.

In yet another traffic prioritization scheme which may be applied on top of this scheme or instead, certain payment plans may be used to enable a network traffic user to "pay" for higher priority access to network data. The priority queue may detect a high-level priority set of traffic from a particular user who has paid extra to not have their network traffic delayed. Other users who have not paid for that priority may have their traffic slowed if the network becomes congested. Certain customers may desire specific types of traffic be prioritized for their users (e.g. the cruise line or a given airline). Those customers may prefer web browsing or email or online streaming as highest priority, depending on the needs of the given customer and/or their client. In this way, the NMS can prioritize in accordance with the desires of the customer being served and the available bandwidth. Certain traffic may be entirely blocked or partially blocked or slowed in a priority list of most important to least important to enable the network to continue to function when bandwidth becomes scarce.

The traffic priority queues may be implemented only in the air-to-ground direction (or sea-to-ground direction) because it is easier for terrestrial-based networks to simply re-send communications if they are lost. But, the queue can be used to minimize re-transmissions from sea or air to ground. Preference is given to "slowing" packets (e.g. using the traffic queues, but continuing to provide the stream of packets) over simply dropping packets. If packets are completely dropped by the sea or air side, then they must be re- and re-sent, thus further clogging up the limited network resources.

Dynamic Traffic Management Profiles

A given satellite connection (or any connection) can be software managed based upon a number of characteristics of the available network connections. So, for example, the software may be made aware of (1) the capacity of a given link (e.g. total channels available, total transponders in use and/or total transponders available on a satellite), (2) the real-time load of that given link (current load on that transponder or transponders), (3) a flat consumption threshold for any connection, and/or (4) a penalty-box process for abusive users.

So, for example, if a satellite has reached 80% of its capacity, the software may dynamically lower a particular connection (e.g. one ship or aircraft) from a first allocated capacity to a second, lower allocated capacity (e.g. 5 Mb/s to 3 Mb/s). This enables the transponder on that satellite to adequately service its load which may involve multiple ships and/or satellites.

Alternatively, the load may be managed on a per user basis because the software is capable of addressing the data needs on a per-craft basis or a per-user basis. So, in an example where one aircraft has only 2 users of the link, but those users are actively streaming video—heavy data users—while another aircraft has 30 users of the same link but they are primarily light users—email and web browsing and messaging, then the software may be capable of allocating bandwidth on that transponder on a per-user basis so that the two heavy users do not ruin the experience for all of the other users on their craft or the other craft. In the past, an entire plane (or modem) would be allocated a certain bandwidth that could be monopolized by one or two users, degrading the experience for everyone else. With a software defined network, those individual users may be managed to make for a better overall experience for every user—even users on other craft, but reliant upon the same transponder. And, in fact, such management is likely necessary on top of the SCPC and SDN connections, otherwise the system would simply continually attempt to allocate more bandwidth without regard to irresponsible uses of that bandwidth by a given remote host or particular user. With such particular management, the overall system can function best, while providing the best overall experience to most or nearly-all ordinary users.

The "penalty box" allocation may be designed to limit a particular user who has been a heavy user for a long period of time (e.g. 30 min) and dynamically limit (or eliminate altogether) that user's bandwidth for another predetermined time (e.g. 30 min) before allowing them to return to normal usage or full bandwidth usage. This process may be dynamic, only taking effect when the network is taxed or strained or may be implemented full-time to ensure that no one dominates the network at any time. In extreme cases (e.g. many network connections at once or long-term high bandwidth users) that user may be completely deactivated for a predetermined time to discourage abuse of the network resources.

Adaptive Transponder Selection

As aircraft or ships move from location to location, they come into and out of the footprints of available transponders. The modems on those craft may be made aware of the utilization of the various transponders that may be available to the modem in that transition. By default, the modems may be instructed to or may automatically select the least-busy transponder to provide a better experience for the users of that network.

Link Aggregation

There are certain times or locations when certain satellites can still provide data, but may have less-than-ideal bandwidth ability or may drop a good number of packets. As a result, their throughput may be reduced either always or only at certain times. One example of such a satellite is a satellite near end-of-life as it runs out of stabilizing fuel to ensure that its orbit remains fixed. When that happens, satellites move around within their orbit. Or, at certain extremes on the horizon, the atmosphere of the earth interferes with radio broadcast. Buying time on those satellites is generally less-expensive because they are less-reliable or less-available or otherwise simply provide less-than-expected throughput.

In such cases, or in cases of need for large quantities of bandwidth, link aggregation may be employed to enable software packetization of data and transmission of that data across multiple satellite connectors or transponders on a given satellite. In cases of moving satellites in decaying orbits, the antenna on a craft may be provided with real-time data or updating data on the position of a given satellite and may be capable of adjusting its antenna to better-position for receipt and transmission of data using one of those decaying orbit satellites.

Multicast File Transfer

There are certain, large data sets that must be transmitted en masse to all aircraft or ships in a fleet. One ready example of such data is streamable movies for display on seatbacks of planes (or devices) or shipboard on-demand movies. A typical movie in the appropriate file format is on the order of one gigabyte. As technology advances, this average file size will no doubt continue to rise.

However, ships and aircraft move in and out of range of satellites and terrestrial connectivity. Also, the bandwidth available to the craft varies depending upon use by the craft and use by passengers on the craft at given times. While on the ground, these craft generally rely upon terrestrial connections rather than satellites. Regardless, these large files must be sent to all craft to enable the movie to be available for viewing on the craft. In such cases, the software may be sufficiently intelligent that it knows which portions of the large file are least-received by the entire fleet of aircraft (e.g. on multiple aircraft at once). Then, the system may choose which portions of a given file to transmit using multicast capability (e.g. UDP transmission) to try and most-efficiently distribute the large file across a large network of planes or ships. This can be iterative until the entire file or set of files are all transmitted, but prioritizes the least-received. In this way, eventually, most planes have most files and most portions of files and the transmission is made the most efficient possible given the up and down ability of the craft to receive the data. In some cases, separate transponders or portions of transponders may be used at all times in the background for this capability so that it is always updating files on the craft as they move or are otherwise available.

Software Defined WAN Performance Enhancement

The wide area networks used for these types of operations are unique in some ways enabling better management of users and the limited bandwidth. Some specific enhancements are set forth below.

The software defined WAN may employ automated disabling an enabling of specific connections. One example above was an abusive user who is taking too much of the available bandwidth. Or, specific users may be automatically disabled if they access certain content or perform inappropriate actions (e.g. packet sniffing) on a network. This can be on a per-user (as opposed to a per craft) basis.

Certain networks may not be available in given geo-locations. So, for example, certain satellites may be physically accessible when in U.S. airspace but may not be licensed for use within U.S. airspace or may otherwise violate United States (or other) laws or regulations to access while in certain locations (e.g. below 10,000 feet). The software can detect a physical location for the craft as it moves and enable or disable access to certain network resources. This may also apply to certain films or content that may be available in certain locations, but not in others.

Packets may be marked (or wrapped) in any number of ways to enable detection of their source of creator or recipient. So, certain users or types of users (e.g. high-profile users or those paying more) may receive certain priority over others. And, certain users may be unified across a given WAN regardless of their location (e.g. shipboard or aircraft) and have priority or may be flagged as bad actors and abusers and de-prioritized. A unified software system for transmission and receipt of those packets can enable across-the-entire-WAN identification of users or user-types.

The software defined network may perform automatic dynamic balancing of traffic based upon network quality. The software can be aware of the quality and availability of a given network or networks and may choose to allocate or deallocate (e.g. if usage charges are time or volume based) certain portions of the network to account for need and link quality. Network quality can include elements like packet retransmission, packet drops, ACK, NACK, http handshake times, and the like.

The software defined network can detect network congestion (or non-use) but, more importantly, can note past network congestion (or non-use) and make anticipatory decisions regarding allocating more deallocating more bandwidth or other portions of the WAN to proactively address anticipated network needs.

Most networks of this type of distribution with moving components attempt to form a tunnel over the WAN for both traffic directions. However, enabling this type of infrastructure requires very close integration with both ends of the transmission (e.g. the modem on the craft and the teleport). A tunnel system must be employed at each end. To dynamically rely upon any available teleport in particular, a single-sided tunnel is preferrable (e.g. traffic from craft to ground). The craft can distribute packets sent without a tunnel from the teleport, while the craft can form a tunnel back to the terrestrial network to more-efficiently utilize the available down bandwidth. This enables the use of almost any terrestrial network on an as-needed basis for better dynamic load allocation and distribution.

The Benefits of the System

The net result of three elements, namely, SCPC, software-defined networks, and data flow control together result in a much more efficient and more easily managed network. Instead of allocating tiny time slots to a plurality of remote hosts, entire channels are allocated. To compensate for the potential inefficiency, those channels are designed to be dynamically sized and re-sized to ensure efficient use of available bandwidth. And, instead of managing TDMA buffers, data flow management or flow control within the allocated channels can regulate overusers, empower conscientious users, and be selective about the types and length of time that traffic flows operate on the allocated channels. Collectively, this system enables more-efficient usage of an SCPC connection or satellite connections more generally, as remote hosts move about within the mobile network. And, the use of software defined networks enables the system to much more dynamically react to actual or expected network needs, improving the efficiency of the system as a whole and user experience for all users.

Description of Apparatus

Referring now to FIG. 1, an overview of a network management system 100 for use with a software defined radio for a mobile network system is shown. The system 100 includes a management server 110, a terrestrial transport station 120, a first satellite 130, a second satellite 140, each with their respective footprints 139, 149, an aircraft 150 and a ship 160 as well as a terrestrial remote host 170. As used herein the phrase “remote host” or word “host” refers to a system member that receives signals sent via satellite from a remote location, such as terrestrial transport station 120 or other remote host, and transmits signals back via satellite. A “remote host” or “host” encompasses aircraft, such as aircraft 150, ships, such as ship 160, and mobile remote hosts, such as terrestrial remote host 170, which may be or include mobile communications uplinks or “hotspots” that may be used in remote locations on the earth or on the sea (e.g. oil platforms) where terrestrial radio may be inaccessible or impractical without the assistance of satellite.

As used herein the word “mobile” means that the device or object (e.g. a remote host) is capable of moving from place to place while continuing to operate. So, for example, a ship, plane or moving vehicle can be mobile and a remote host. The network systems envisioned herein can operate on fixed remote hosts, but the specific methods and systems described are designed to operate equally well on mobile remote hosts, as they move from place to place. Likewise a "mobile network" is a network that operates while one or more components of that network are in motion (e.g. the mobile remote hosts).

The management server 110 is a computing device or computing devices that operate to manage the communication processes for the system 100. The management server 110 is shown as a set of computing devices, but may be many computing devices spread throughout various locations with functions relevant to portions of the management of the system 100 delegated or otherwise managed by different physical or logical computing devices.

The management server 110 is responsible for allocating and deallocating channels used by the system 100. As indicated above, SCPC connections operate on a single channel per carrier model. So, a single transponder may carry many channels, each allocated a particular bandwidth within an available range, and associated with a throughput based upon that available bandwidth. However, the management server 110 is responsible for setting those channels, their bandwidth, and determining the remote hosts and satellites to which and through which that data is routed. In some cases, an entire transponder may be allocated, across what would ordinarily be many channels, as a single, large channel. Or, several larger channels if the signal would be to attenuated by such an arrangement. In other cases, a single transponder on a satellite may be tightly controlled with many channels all servicing different remote hosts, with remote hosts coming and going as they enter and leave the footprint of the respective satellite.

The management server 110, as will be discussed in more detail below, manages all aspects of channel and transponder and satellite allocation and deallocation as well as selectively controlling traffic on those channels, transponders, and satellites to dynamically and efficiently manage the overall traffic of the system 100 to maximize a positive data utilization and access experience for users of the system 100.

The terrestrial transport station 120 may be or include a computing device. The terrestrial transport station 120 also includes one or more satellite transmitters and/or receivers (or transceivers) and communicates with remote hosts via satellites, such as satellites 130, 140. The terrestrial transport station 120 is shown as a single station, but in reality may be many transceiver stations, positioned in various places around the world, or communicating via multiple satellites simultaneously. The terrestrial transport station 120 is "terrestrial" in the sense that it is fixed to the ground or earth and, therefore, has access to high-speed terrestrial networks and other network connected functions (such as the management server 110 and general access to the internet and services on the internet). The terrestrial transport station 120 may be controlled by the management server 110 as directed and discussed herein.

The first and second satellites 130, 140 are satellites suitable for communication with data transmitted and received by one or more terrestrial transport stations 120 and transmitted and received by one or more remote hosts, such as the aircraft 150, the ship 160 and the terrestrial remote host 170. The satellites may be, for example, C, $K_u$ or $K_a$ band satellites and may communicate on those respective frequencies. Each satellite may have a corresponding number of available transponders for their respective bands (e.g. C band typically uses 24 transponders which communicate on frequencies spaced 20 Mhz apart).

However, because the first and second satellites 130, 140 are software-controlled by the management server 110, their particular configuration may be alterable (or logically alterable) such that multiple transponders (e.g. frequency channels) may be allocated to a single "logical" channel or otherwise used to dynamically increase or decrease available bandwidth to a single remote host or group of remote hosts.

The first satellite 130 and second satellite 140 are only different as shown in FIG. 1 insofar as they have different, but overlapping footprints 139, 149. These footprints 139, 149 are the areas on the earth or near-earth (e.g. on planes in the air) which are serviced by the respective first satellite 130 and second satellite 140. In practice, the first and second satellite 130, 140 could operate on different bandwidths, but that may be undesirable from a hardware perspective to be forced to incorporate different types or styles of antennae in the terrestrial transport station 120 and/or the remote hosts.

The aircraft 150 is a traditional commercial or private aircraft. The aircraft is fitted with a satellite antenna (e.g. dish) suitable to communicate via the first and/or second satellite 130, 140. For aircraft purposes, these antenna are often covered or otherwise shielded from the exterior wind speed and exposure to the elements, and are often housed within a radome. Satellite antennas may be simple, effectively aiming "upwards" toward the sky, or may be complex, depending on the band of satellites used for communication. Likewise, these complex antennae may be required to periodically or continuously re-align themselves with a given satellite to maintain a connection or to transition a connection to a new satellite and/or band.

Preferably, a satellite antennae array in aircraft 150 may be made up of two or more antennae. In this way, a first connection on a first antenna may be maintained, whether by periodic adjustment or merely by selecting to receive/transmit upon a certain frequency, while a second connection may be initialized and maintained on a second frequency and/or satellite. In this way, an antenna array may double its throughput or significantly smooth the transition between two satellite footprints thereby handing off data transfer between the two data sources.

The ship 160 is in virtually every respect similar to the aircraft 150, except it is shipbound. Ships, like ship 160, may have to contend with ocean waves and tides, which can more-regularly alter the calibration or alignment of satellite antennae. However, ships may be outfitted with gimbals or other systems which periodically or regularly adjust the antenna alignment as needed to maintain a connection, in addition to or as a replacement for the adjustments provided-for by the built-in alignment systems.

The terrestrial remote host 170 is much the same as the aircraft 150 and ship 160, but is typically more fixed (e.g. a mobile hot-spot style station for providing internet connectivity in a remote location or on an oil rig or for military application). However, such a terrestrial remote host 170 might be a moving recreational vehicle on a highway or power boat on a lake or the like. The same general considerations and characteristics otherwise match the aircraft 150 and ship 160.

Figure 2:
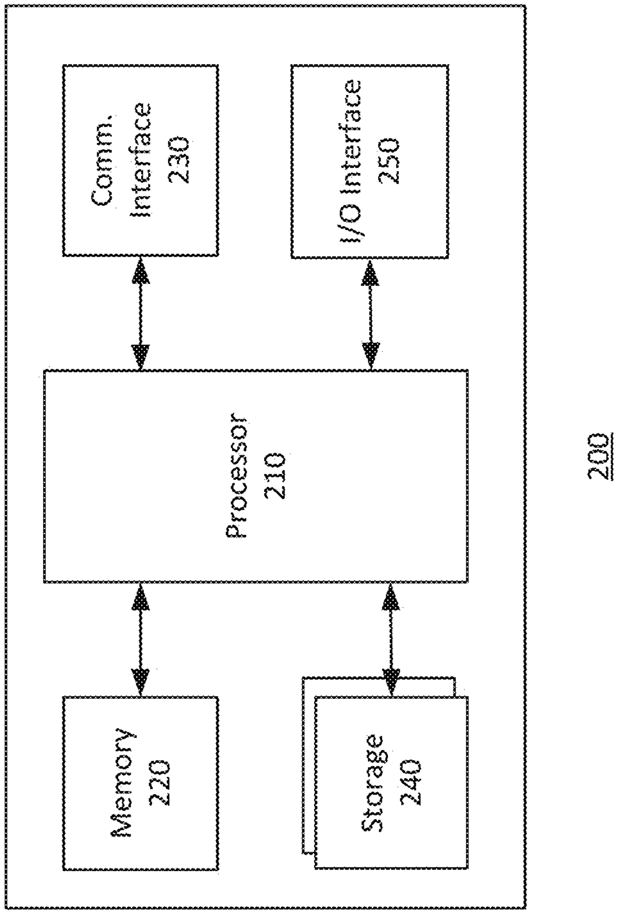
FIG. 2 is a block diagram of an exemplary computing device.

FIG. 2 is a block diagram of an exemplary computing device 200, which may be or be a part of the system shown in FIG. 1, making up a part of the management server 110, the terrestrial transport station 120, the first satellite 130, the second satellite 140, each with their respective footprints 139, 149, the aircraft 150 and the ship 160 as well as the terrestrial remote host 170. of FIG. 1. As shown in FIG. 2, the computing device 200 includes a processor 210, memory 220, a communications interface 230, along with storage 240, and an input/output interface 250. Some of these elements may or may not be present, depending on the implementation. Further, although these elements are shown independently of one another, each may, in some cases, be integrated into another.

The processor 210 may be or include one or more microprocessors, microcontrollers, digital signal processors, application specific integrated circuits (ASICs), or a systems-on-a-chip (SOCs). The memory 220 may include a combination of volatile and/or non-volatile memory including read-only memory (ROM), static, dynamic, and/or magnetoresistive random access memory (SRAM, DRM, MRAM, respectively), and nonvolatile writable memory such as flash memory.

The memory 220 may store software programs and routines for execution by the processor. These stored software programs may include an operating system software. The operating system may include functions to support the input/output interface 250, such as protocol stacks, coding/decoding, compression/decompression, and encryption/decryption. The stored software programs may include an application or "app" to cause the computing device to perform portions of the processes and functions described herein. The word "memory", as used herein, explicitly excludes propagating waveforms and transitory signals. The application can perform the functions described herein.

The communications interface 230 may include one or more wired interfaces (e.g. a universal serial bus (USB), high definition multimedia interface (HDMI)), one or more connectors for storage devices such as hard disk drives, flash drives, or proprietary storage solutions. The communications interface 230 may also include a cellular telephone network interface, a wireless local area network (LAN) interface, and/or a wireless personal area network (PAN) interface. A cellular telephone network interface may use one or more cellular data protocols. A wireless LAN interface may use the WiFi® wireless communication protocol or another wireless local area network protocol. A wireless PAN interface may use a limited-range wireless communication protocol such as Bluetooth®, Wi-Fi®, ZigBee®, or some other public or proprietary wireless personal area network protocol. The cellular telephone network interface and/or the wireless LAN interface may be used to communicate with devices external to the computing device 200.

The communications interface 230 may include radio-frequency circuits, analog circuits, digital circuits, one or more antennas, and other hardware, firmware, and software necessary for communicating with external devices. The communications interface 230 may include one or more specialized processors to perform functions such as coding/decoding, compression/decompression, and encryption/decryption as necessary for communicating with external devices using selected communications protocols. The communications interface 230 may rely on the processor 210 to perform some or all of these function in whole or in part.

Storage 240 may be or include non-volatile memory such as hard disk drives, flash memory devices designed for long-term storage, writable media, and proprietary storage media, such as media designed for long-term storage of data. The word "storage", as used herein, explicitly excludes propagating waveforms and transitory signals.

The input/output interface 250, may include a display and one or more input devices such as a touch screen, keypad, keyboard, stylus or other input devices. The processes and apparatus may be implemented with any computing device. A computing device as used herein refers to any device with a processor, memory and a storage device that may execute instructions including, but not limited to, personal computers, server computers, computing tablets, set top boxes, video game systems, personal video recorders, telephones, personal digital assistants (PDAs), portable computers, and laptop computers. These computing devices may run an operating system, including, for example, variations of the Linux, Microsoft Windows, Symbian, and Apple Mac operating systems.

The techniques may be implemented with machine readable storage media in a storage device included with or otherwise coupled or attached to a computing device 200. That is, the software may be stored in electronic, machine-readable media. These storage media include, for example, magnetic media such as hard disks, optical media such as compact disks (CD-ROM and CD-RW) and digital versatile disks (DVD and DVD±RW), flash memory cards, and other storage media. As used herein, a storage device is a device that allows for reading and/or writing to a storage medium. Storage devices include hard disk drives, DVD drives, flash memory devices, and others.

Figure 3:
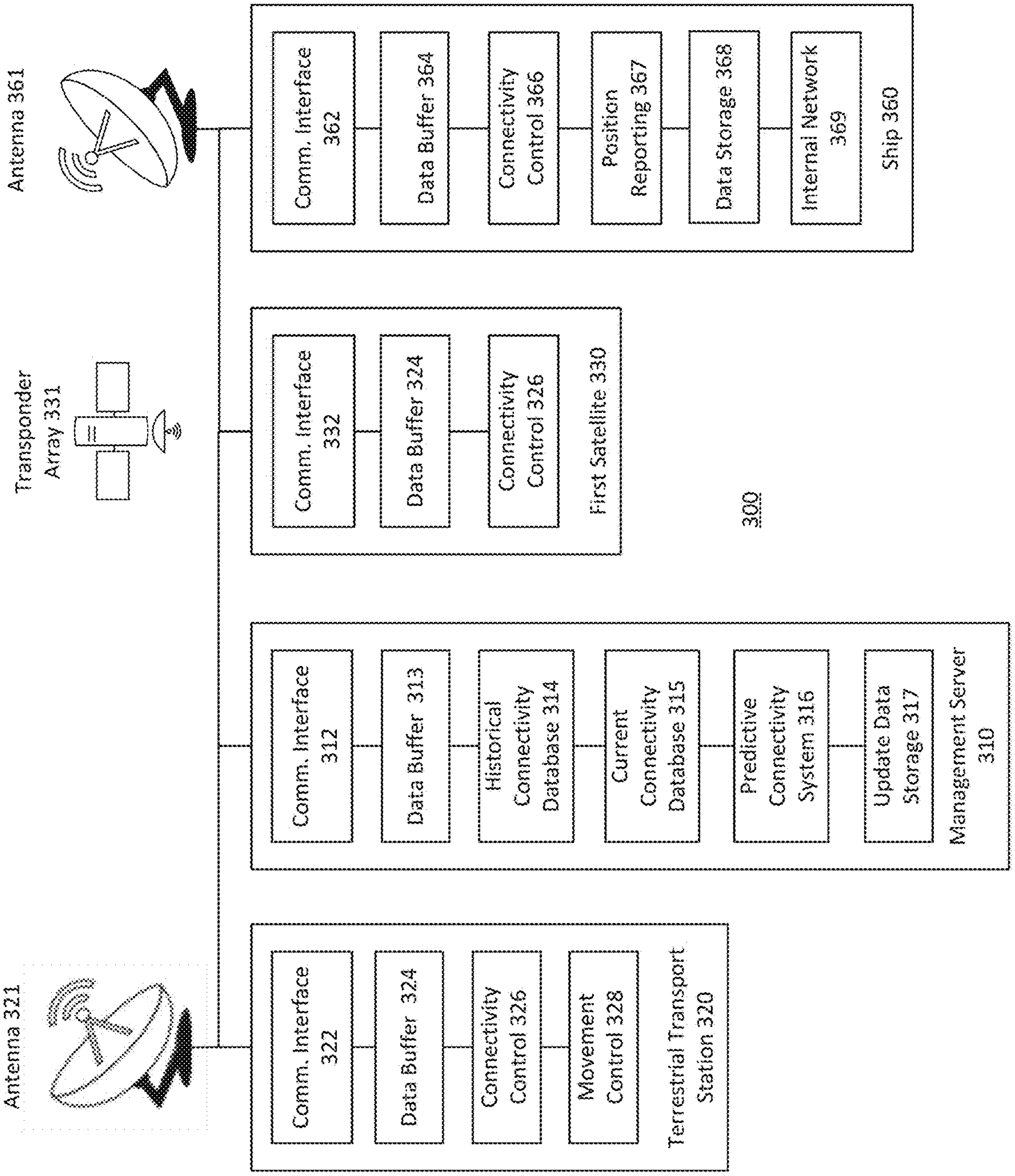
FIG. 3 is a functional block diagram of a network management system 100 for use with a software defined radio for a mobile network system.

FIG. 3 is a functional block diagram of a network management system 300 for use with a software defined radio for a mobile network system. The system 300 includes the management server 310, the terrestrial transport station 320, the first satellite 330 and the ship 360 of FIG. 1. The second satellite 140, airplane 150, and terrestrial remote host 170 are excluded as offering functionality substantially duplicative of the components making up the system 300 shown.

The management server 310 includes a communications interface 312, a data buffer 313, a historical connectivity database 314, a current connectivity database 315, a predictive connectivity system 316, and update data storage 317.

The communications interface 312 is used to enable communications between the management server 310 and other components of the system 300. The communications interface 312 may be or include physical and logical layers used to enable data communications (e.g. the TCP/IP protocol stack and/or network routers and modems), but also includes custom software to enable the management server 310 to control the way in which the terrestrial transport station 320, the first satellite 330 and the ship 360 communicate within the system 300. These controls may alter the channels, transponders, or satellites used by the various portions of the system 300.

In the past, many satellite users at a commercial or military level would license only a subset of the available bandwidth on a satellite to reserve it for use. Then, that bandwidth (often a set of channels on a transponder or an entire transponder or group of transponders) would always be available to that user. However, much of that bandwidth may go unused at any one time (e.g. late at night or at other non-peak times) resulting in an inefficient allocation of that bandwidth. As satellite providers increasingly move to on-demand or prioritization of needs for bandwidth and the ability to dynamically allocate more or less bandwidth, the use of the management server 310 and the communications interface 312 to control the allocation and deallocation of bandwidth for a set of satellite communications systems can powerfully shape efficient and cost-effective use of those resources.

The management server 310 also includes a data buffer 313 that may be used in the process of queuing data up to be transmitted to any one of the station 320, the satellite 330 or the ship 360 or any other connected remote host or satellite. The data buffer 313 may be used for the transmission of large data sets, discussed below with respect to update data storage 317, such as updates to the operating firmware or other components of the system 300 or to data repositories such as those which may be present on the ship 360 or an airplane.

The historical connectivity database 314 is a repository of data related to the connections previously used by the system 300 at different times and days and months and years. This data can be quite compact, merely representing periodic text files or database entries that may be complied, reviewed, and compared by software or humans to detect trends, typical scenarios, or other past results. Using this data, the predictive connectivity system 316, may generate preliminary or proposed routing schemes whereby certain satellites are expected to be used for certain remote hosts and certain times, days, months, or during certain events.

The current connectivity database 315 is a database that is maintained identifying all of the current connections (e.g. satellite and remote host combinations) maintained by the system 300. As this connectivity database 315 is updated, that may cause the management server 310 to instruct certain satellites and/or remote hosts (like ship 360) to transition to different channels, transponders, or satellites as various changes in the state of things occur (e.g. new ships enter a footprint, a channel or transponder becomes crowded with data users, the ship travels to a new footprint, etc.).

The predictive connectivity system 316 is used to manage connectivity between various satellites and remote hosts managed by the system 300. The system can simply act to allocate available bandwidth for each remote host as fairly as possible in view of available bandwidth for that remote host and other remote hosts serviced by the same satellite or group of satellites.

The predictive connectivity system 316 may operate to periodically update the channels, transponders, and satellites used to service a given remote host, both based upon real-time data (e.g. a ship is moving out of the footprint of a satellite currently providing bandwidth) and predictive data (e.g. it is expected, based upon data in the historical connectivity database 314 that several planes in the air, serviced by a certain satellite, will all begin to need more bandwidth). In this way, the software-defined network system 300 of FIG. 3 is managed by the predictive connectivity system on a real-time basis to dynamically allocate and deallocate available bandwidth and other resources to provide satellite connectivity to a plurality of remote hosts (e.g. planes, ships, oil rigs, and moveable platforms).

The update data storage 317 is a data repository for data updates to remote hosts as well as instructions for their use and intelligence about how best to provide those updates to remote hosts. So, for example, an entire repository of digital films that are available for streaming on planes as a part of an in-flight entertainment system or on ships as a part of in-cabin television service may be stored in the update data storage 317.

Planes are an interesting example, because satellite connectivity directly to planes is generally not permitted below 10,000 feet. So, these updates must roll out when planes are available to receive the data and when users on those planes are not otherwise engaging with the system 300 to utilize large amounts of network data whereby large updates (e.g. entire digitized films) would potentially disrupt ordinary users of the internet connectivity on the planes. So, the update data storage 317 may rely upon the predictive connectivity system 316 to determine a best time to provide these large (or small) updates to various remote hosts so as to both maximize the power of the update and minimize disruption to ordinary user function.

In one case, the predictive connectivity system may rely upon data in the update data storage 317 to detect that one particular update is the least-updated across the overall fleet of planes, but may realize that most of those planes are not in position to receive the update. So, the system 300 may select a lower-priority update, but one that is most-likely to be received by the most planes or other remote hosts. The management server 310 may rely upon multicast delivery of this kind of content, and transmit it to all planes across multiple satellite footprints or only to those in a given footprint (e.g. the east coast of the U.S.) with a view to selecting the update that the least, available planes have. By selecting the update which the least planes or other remote hosts that are available have, the multicast transmission can maximize the use of the available bandwidth to reach the most remote hosts and thereby intelligently distribute the update. Smaller transmissions, including direct transmissions using cellular or 802.11x wireless can be used to fill in gaps, if they occur and the remaining data needed is small. And, because the system 300 is intelligent, it can be quite precise, knowing which exact bits or bytes of a given update are least-received by the most of the available planes. So, gaps in any content are filled in an intelligent way. This process will be discussed in more detail below with respect to FIG. 8.

The terrestrial transport station 320 includes a communications interface 322, a data buffer 324, connectivity control 326, and movement control 328. An antenna 321 communicates via the first satellite 330 to the ship 360.

The satellite antenna 321 is an antenna or antennae suitable for communication with the first satellite 330 and any other satellites used by the system 300. It may be a single satellite, but is preferably several satellites to enable communication with multiple satellites and over multiple frequencies and to overall increase throughput and utilization of the data available to the system 300.

The communications interface 322 operates in much the same way to manage communication between the terrestrial transport station 320 and the first satellite 330 (or other satellites) and the ship 360 (or other remote hosts). The communications interface passes data between remote hosts using the first satellite 330 (or other satellites) as instructed by the connectivity control 326 and as sent from the management server 310 or some other internet data source. The communications interface 322 is software-controlled such that its function, including channels, transponders, position, and protocols can be altered as directed by the management server 310.

The data buffer 324 temporarily stores data to be sent or received data before it reaches its final destination. The data buffer 324 may be used when the data being received or being sent exceeds the terrestrial transport station 320's ability to move the data out. In TDMA systems (not used here), the data buffer 324 can serve to store up data to be transmitted until a time slot is available to send that data. In general, the data buffer 324 will be less-used in the system 300 proposed herein than in a TDMA system.

The connectivity control 326 is software that instructs the terrestrial transport station 320 to which frequency channel and in the available parameters of data throughput (e.g. three channels, totaling 5 Mb/s throughput at these frequencies). The connectivity control 326 operates at the behest of the predictive connectivity system 316 of the management server 310 to respond intelligently as directed.

The movement control 328 adjusts the physical movement of the satellite antenna 321 (or array thereof). This enables the predictive connectivity system 316 to control which azimuth to position itself for transceiving and any other movement-related parameters. As will be discussed below, certain satellites have poor, decaying, or irregular orbits, but that often can be predicted. Some of those orbits have interference from the sun or the horizon of the earth itself. As a result, throughput may be lesser than that for "healthy" satellites. But, the predictive connectivity system 316 can utilize its historical connectivity database 314 to estimate these poor orbits, account for them, and rely upon them. Thereafter, the predictive connectivity system 316 may instruct the movement control 328 to move the antenna 321 to account for the poor orbit thereby relying upon an otherwise unreliable satellite.

The first satellite 330 includes a communications interface 332, a data buffer 324, and connectivity control 326. A transponder array 331 enables communication between the antenna 321 and antenna 361 (and other antennae). The second satellite of FIG. 1 is not shown, but the second and any other of an array of available satellites function similarly to the first satellite 330. Therefore, other satellites are not described herein.

The transponder array 331 is the element (or elements) that communicate with the terrestrial transport station 320 and the ship 360 (or other remote hosts). The transponder array 331 is a set of individual transponders, each having a plurality of frequency channels that can be allocated among a set frequency range upon which the transponder is set to communicate. The transponders send and receive (effectively acting as a "bounce" for the signal headed to the ship 360 (or other remote hosts). Transponders repeat the signal, thereby amplifying it for the intended recipient, and broadcast it to a footprint (or send it in a tighter footprint to a particular receiver).

The communications interface 332 serves a similar function to that of the communications interface 322. It operates likewise under the direction of the predictive connectivity system 316.

The data buffer 324 is a short-term data repository for data sent via the first satellite 330. The data buffer 324 is used, for example, in TDMA transmission and may be used as a part of the repeater function in SCPC transmissions as well to store data momentarily while or before it is rebroadcast.

The connectivity control 326 is able to change the particular allocation of channels and frequencies and transponders for the first satellite 330 under the direction of the predictive connectivity system 316. The connectivity control 326 is software-controlled and can change how the first satellite 330 operates but is generally limited to functions available to a user. So, the predictive connectivity system 316 cannot generally alter the orbit of the first satellite 330 or take over management or use of transponders which have not been leased from the satellite owner or provider. But, otherwise, the first satellite 330 may be under the control of predictive connectivity system 316 as it instructs the connectivity control 326.

The ship 360 includes a communications interface 362, a data buffer 364, connectivity control 366, position reporting 368, and an internal network 369. The antenna 361 transmits data via the first satellite 330 to the terrestrial transport station 320. A ship 360 is shown, but operates in much the same way as a plane would operate or another remote host, so additional remote hosts are not shown.

The antenna 361 is an antenna array that may communicate with one or more satellites, like first satellite 330 to send and receive data bound for the ship 360 and the terrestrial transport station 320 (or the internet itself).

The communications interface 362 operates in much the same way it does for the other elements of this system 300. The communications interface is under the control of the predictive connectivity system 316.

The data buffer 364 can be used to queue data, much as it does for the first satellite 330 and the terrestrial transport station 320 and the management server 310.

The connectivity control 365 is software that controls the way in which the antenna 361 and the ship 360 communications system operates. Connectivity control 365 can alter the frequencies, channels, satellites, transponders, and protocols associated with the ship 360 and by which the terrestrial transport station 320 communicates with the ship 360.

The position reporting 367 is an informational service that may rely upon GPS (global positioning system) or similar positioning systems to advise the management server 310 of the location of the ship 360 (or plane or other remote host in some cases). This information is stored in the current connectivity database 315 and the historical connectivity database 314 to be used by the management server 310 in making intelligent decisions regarding the satellites, channels and bandwidth allocations necessary or useful for the system 300.

The data storage 368 may be used to store large data sets such as entire digital films sent by the update data storage 317. Other data sets may be podcasts, instructional or entertainment or safety videos for the ship 360, audio for streaming or download, video games that may be played on cabins, and other, similar, larger data sets. Similar storage may be used on planes and ships for information about available products, stores, billing, and customer information helpful to the crew.

The internal network 369 is representative of an internal network on the ship 360 that is accessible, for example, to passengers and crew, and which may be serviced by the antenna 361 and connectivity control 366.

Description of Processes

Figure 4:
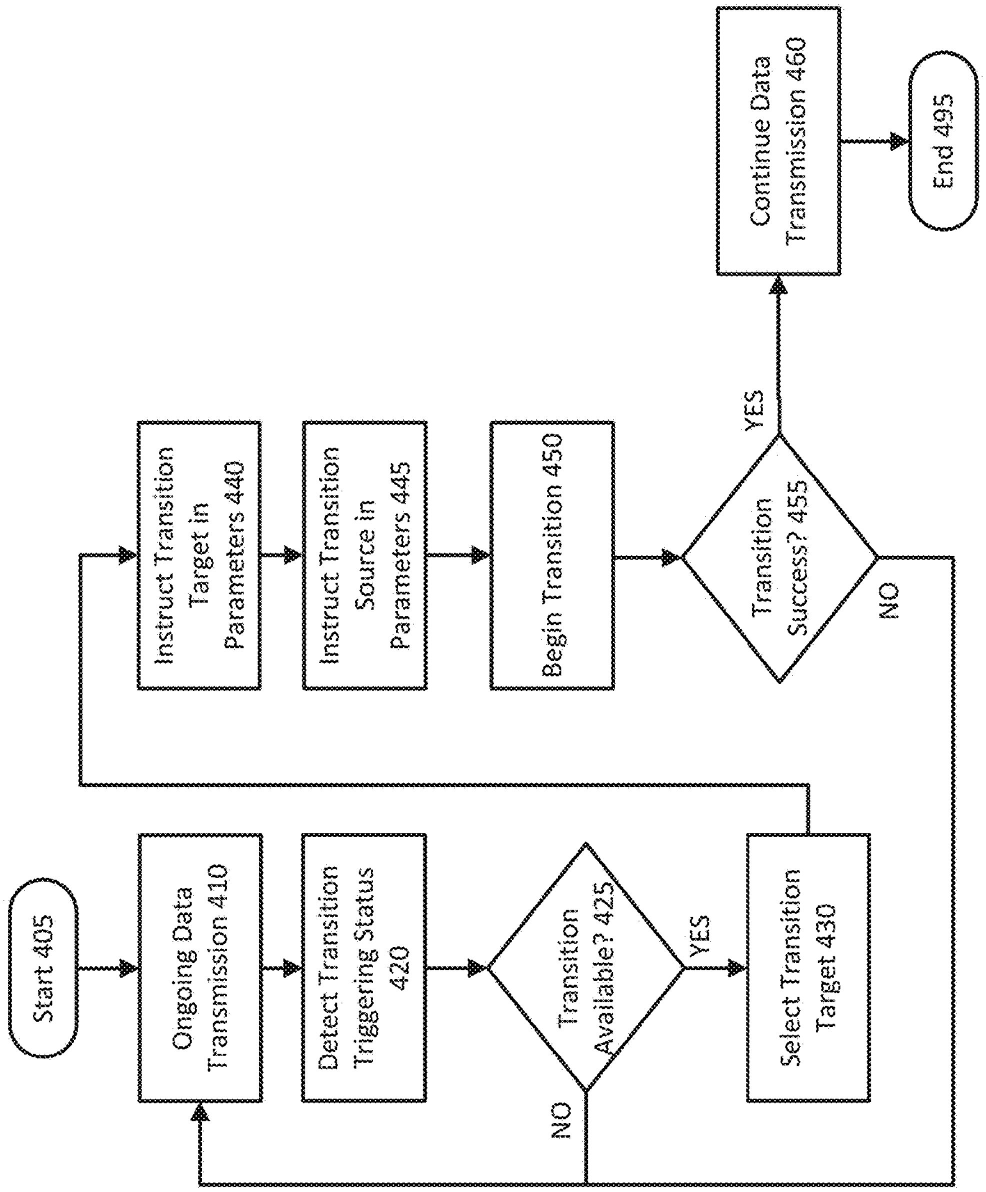
FIG. 4 is a flowchart of a process for detection and transition between data receivers/transmitters.

FIG. 4 is a flowchart of a process for detection and transition between data receivers/transmitters. The process has a start 405 and an end 495, but may take place many times and for many satellite/remote host combinations over the course of any given period of time.

Following the start 405, the process begins with an ongoing data transmission at 410. This process presumes that an initial setup of one or more satellite transport station, satellite, and remote host communications has been set up and is functioning properly. In the state represented by step 410, the system is operating, potentially many satellites simultaneously, connected to potentially numerous remote hosts providing two-way data communications to thereby provide internet access and access to large data sets to the remote hosts, as well as to provide status information regarding the ship, plane or other remote hosts to any management system (e.g. the management server 310 of FIG. 3).

Next, the management server 310 detects a transition triggering status at 420. This triggering status may be any number of conditions or states of the overall system or of individual components of the system. For example, the status may be an indication that the available transponders covering a geographic area serviced by the plurality of satellite transponders is fewer than suitable to cover all currently-connected or soon-to-be connected remote hosts, the utilization of a particular channel of a plurality of channels is more or less than is optimal (e.g. requires more bandwidth than is available or is using only a small portion of allocated bandwidth), the utilization of a plurality of channels relative to a particular channel such that more channels may be allocated to a particular remote host or other remote hosts currently require channels allocated to a particular remote host, the utilization of a total of available bandwidth across the plurality of transponders that is utilized by a plurality of remote hosts including the remote host, movement of one or more remote hosts into or out of the geographic area serviced by a plurality of satellite transponders servicing a footprint covering the remote hosts, and movement of other remote hosts into or out of a geographic area serviced by the plurality of satellite transponders.

Other transition triggering status may be more nuanced. The predictive connectivity system 316 may indicate that in the past at a particular time and/or location, a certain level of bandwidth is typically necessary to properly service a group of remote hosts within a footprint covered by a one or more satellites. Or, the predictive connectivity system 316 may recognize that one or more remote hosts are moving or typically move at a predetermined time on a date from a first footprint serviced by a first satellite into a second footprint serviced by a second satellite. Or, a triggering status may be that an allocated set of channels may be inadequate to service one or more remote hosts. Various other triggering status are possible, either representing an inadequate or overabundance of available bandwidth or channels for a group of remote hosts serviced by a given satellite. Importantly, the determination is made on the basis of a plurality of remote hosts serviced by a satellite, rather than on a per-remote-host basis or based upon a pre-selected set of bandwidth that is always allocated for each remote host. The software defined network of the present system enables intelligent allocation of resources in real-time for all remote hosts reliant upon the same satellite to best-allocate channels and data bandwidth available among those remote hosts being serviced and, even, as necessary, transitioning certain remote hosts to other satellites with more available bandwidth or channels or both.

Next, a determination is made at 425 whether there is a transition satellite (or transponder or channel) available ("no" at 425). If no target transition is available, then the process continues with ongoing data transmission at 410. This may take place in the situation in which there are no other available satellites (or transponders or channels) available for any transition. Or, it may take place in cases where a single satellite (or one that is available to the system anyway) services a particular area. Or, because data can be allocated and deallocated in real-time or based upon long term contracts on satellites, there may not be any additional satellites (or transponders or channels) available at the present time, even if they may become available soon or in the future.

However, if the predictive connectivity system 316 is aware that there is at least one suitable transition target ("yes" at 425), then the transition target is selected at 430. The selection (from potentially among many possible targets) itself will depend upon many factors such as available resources, how those existing resources have already been allocated to the remote host and to other remote hosts, and any planned or upcoming transitions of the remote host or other remote hosts (e.g. some may transition to different satellites soon or may have already). This target may be a new satellite, a new transponder, a new channel, or a different allocation of any of the foregoing. So, for example, it may be adding a transponder or taking away a transponder available to a remote host. It may be adding a channel or taking away a channel available to a remote host. The transition may be completely transitioning a remote host to a new satellite, or it may be transitioning one of an array of satellite antenna from an existing satellite (or transponder or channel) to a different satellite (or transponder or channel) by instructing that satellite antenna to change its azimuth to that of the new source.

Next, the predictive connectivity system 316 (FIG. 3) will instruct the transition target in the parameters at 440. Here, the satellite will receive software-defined parameters governing its soon-to-begin service to the remote host that is transitioning to that target satellite (or transponder or channel). These parameters may enable the quickest transition by instructing both the satellite and the antenna on the remote host of the exact parameters for the communication to come. The satellite (and associated terrestrial transport station) can begin communications in an ordered fashion, with the remote host's satellite antenna properly aligned and tuned to begin receiving data as soon as it begins broadcasting. Even in cases where a movement of the satellite antenna is needed, it can move to a known alignment, handshake immediately, and begin data transmission.

Next, the predictive connectivity system 316 will instruct the remote host of the transition source in parameters at 445. This instructs the particular remote host or hosts in their new satellite target(s), channels, transponders along with any particular handshake or other information that need be known to enable the transition. By informing the satellite and the remote host of the parameters, speedy transitions, on the order of less than two seconds (often less than 400 milliseconds) are typically possible, rather than the much slower TDMA transitions.

Thereafter, the transition begins at 450. Here, the remote hosts and satellites begin communicating on the newly transitioned satellites (or transponders or channels) and data begins being passed after the handshake was completed at 440 and 445. The entire transition process can be completed because all of the relevant data related to the new channel, frequency, and satellite may be provided ahead of time. This is not possible in the prior art under TDMA systems.

A determination is made whether the transition was a success at 455. If not ("no" at 455), then the data transmission that previously or currently existed continues being used for the ongoing data transmission at 410. If it was successful ("yes" at 460), then the data transmission is continued at 460, using the newly transitioned target satellite (or transponder or channel) which may be in place of or in addition to the original or pre-existing satellite (or transponder or channel) in some cases.

The process then ends at 495, but may repeat for a further transition.

Figure 5:
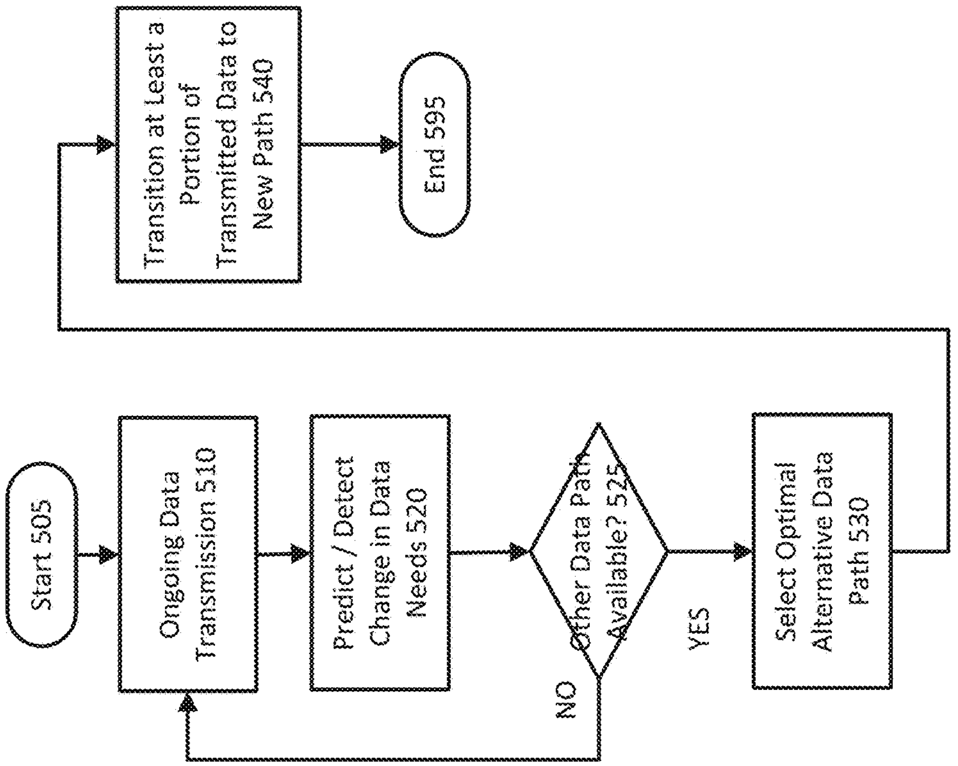
FIG. 5 is a flowchart of a process for a responsive transition between active and potential data transmission paths.

FIG. 5 is a flowchart of a process for a responsive transition between active and potential data transmission paths. The process begins at 505 and ends at 595, but may repeat many times in response to changes in data needs for one or more remote hosts.

Following the start at 505, the process begins with an ongoing data transmission at 510. Here, data is being transmitted and received by a combination of a selected satellite and remote host via a selected transponder/channel.

At 520, a prediction or detection of a change in data needs occurs. Here, in a detection situation, the predictive connectivity system 316 detects that one or more of a group of remote hosts is utilizing more than a predetermined threshold of data (e.g. greater than 80% of its available bandwidth or 95% of available bandwidth) or is significantly underutilizing available bandwidth by a similar threshold (e.g. using only 20% of available bandwidth). This detection will preferably not be instantaneous, but will be averaged over a predetermined period such as five minutes, twenty minutes, or an hour.

In such a case in the prior art, there may be little that can be done or to do to alter this state. A given satellite may have its pre-determined bandwidth capacity and it may be unalterable until many days or weeks later. Or, TDMA may only provide for a limited amount of flexibility for a given remote host or group of remote hosts.

However, under an SCPC connection scheme, the number of channels and the size of those channels dedicated to a particular remote host may be altered in real-time to deal with these kinds of problems. Other remote hosts may be directed to utilize smaller channels or to return all or part of the frequency previously used for a channel so that it may be reallocated to another remote host. Because the system is aware of all of the remote hosts, not just the issue that the present channel is being over-utilized or under-utilized, the system can react wholistically and efficiently to all needs, rather than trying to manage bandwidth usage (e.g. slowing down connections) or impose strict rules on what may or may not be done with available bandwidth.

In the inverse situation, where bandwidth is being underutilized, then the predictive management system 316 may detect that and deallocate the data to be better utilized in more or altered channels by other remote hosts.

However, the process shown in element 520 also incorporates a predictive nature. Reliant upon the data in the current connectivity database 315 and the historical connectivity database 314, the predictive connectivity system 316 may preemptively recognize that a change in data needs is about to occur, again either an increase in need or a decrease in need. This may be recognizing that database 314 shows that more or less data will be needed in the future as compared to the data shown by database 315. In such a state, the system 316 can instruct the ground transport station 320, the satellite 330 and the remote host (e.g. the ship 360) to relinquish all or part of a channel or to begin using all or part of an additional channel (or transponder or satellite) to satisfy anticipated data needs. Predictive detection is preferrable in many cases because it can avoid data congestion or inefficient allocations ahead of the anticipated need. The use of a software defined network enables the system to both react and preemptively react to address actual and expected needs.

Next, a determination whether another data path is available is made at 525. Here, the query is whether there is (or could be) another satellite, transponder, or channel which could become a data path (coupled with a ground transport station) for a given remote host or hosts. This calculus can be somewhat complex. In the simplest case, an unused channel may be available on the same satellite. In such a case, only the parameters related to that channel need me shared to enable the system to begin communicating on that channel. In more complex cases, it may required that the system recognize that there are, for example, six remote hosts sharing a satellite, but one of those remote hosts is about to move into a footprint of a different satellite or could have its antenna alignment altered to reach a different satellite. Thereafter, the remaining five remote hosts could each be allocated a portion of the freed-up bandwidth on the original satellite or only one or two remote hosts could be allocated this extra bandwidth. Then, each of the remote hosts—those both potentially gaining bandwidth and the one losing bandwidth—must be instructed by the system in the overall new communication parameters. Then, each of those transitions must be actually caused to take effect.

In any case, if there is no other data path available ("no" at 525), then there is no answer for the change in data needs and the process continues with ongoing data transmission at 510.

If there is another data path available ("yes" at 525), then the optimal alternative data path is selected at 530. Here, as indicated above, this may simply be selecting a new or additional channel for data to use for a given remote host. Or, it may mean substantially simultaneously transitioning a number of remote hosts to different satellites, transponders, or channels to free up or otherwise reshuffle data availability to enable the desired change for added efficiency or better throughput for a remote host in need of more data.

Thereafter, at least a portion of the data transmitted on existing channel(s) for a given host is transitioned to the selected new data path at 540. This is from the perspective of a single of the remote hosts, but this may take place for some or all remote hosts for which the new data path required some other change.

Thereafter, the process ends at 595.

Figure 6:
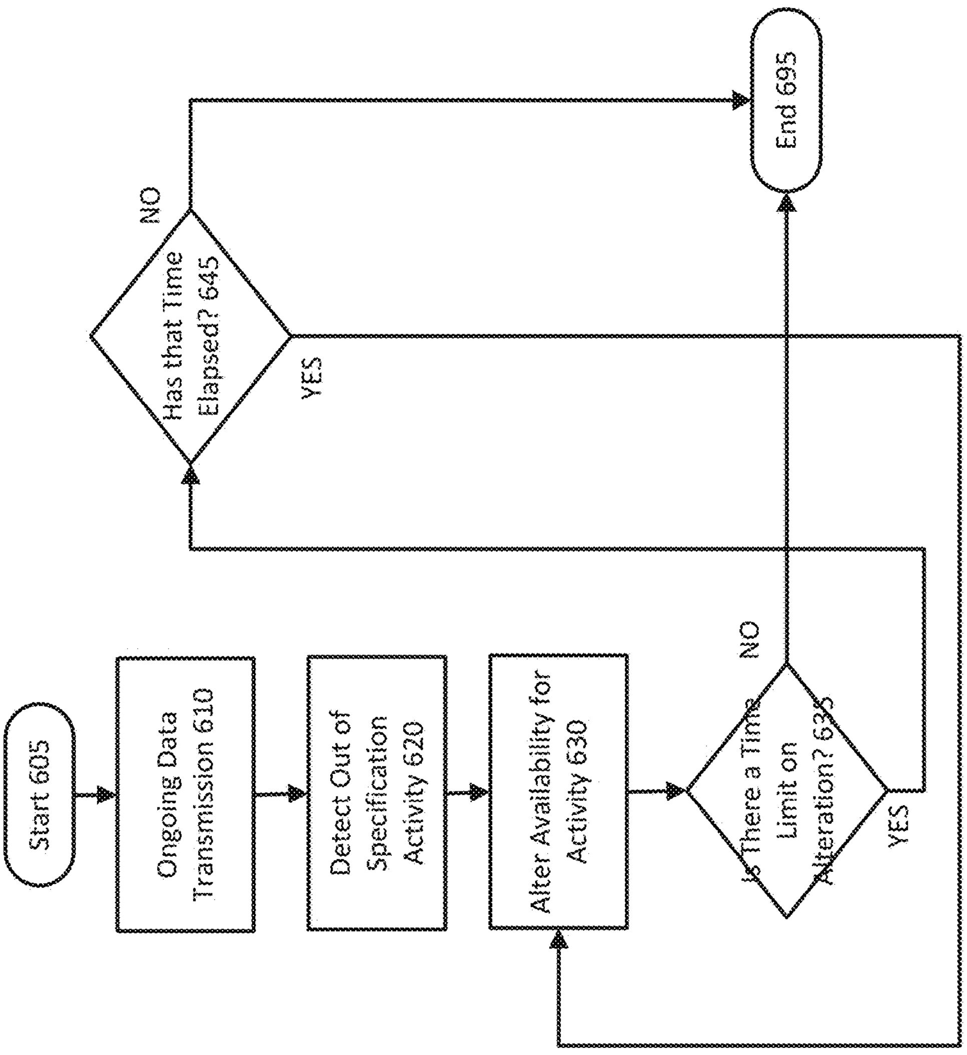
FIG. 6 is a flowchart of a process for selectively altering network activity.

FIG. 6 is a flowchart of a process for selectively altering network activity.

The process has a beginning at 605 and an end at 695. The process may take place many times over and be started and restarted again and again for the same or different users.

After the start 605, the process begins with an ongoing data transmission at 610. This is much the same as the transmissions in FIGS. 4 and 5.

Thereafter, an out of specification activity is detected at 620. This may be a broad phrase meaning activity that is not sanctioned, abusive, inefficient, disfavored, or otherwise an activity that the operator of the management server 310 wishes to minimize across the network. Alternatively, it could be "out of specification" in the sense that it is high priority data, a high priority user, or a military user or the like who requires better-than-average data throughput or access. In traditional satellite data systems, typically reliant upon TDMA connections, it could be difficult to detect individual users or activities. And, even if one could, the options for altering service to a single user were slim.

Through the use of a software defined network, priority queues, priority lists, preferred treatment (e.g. VIP access) and the like are possible through various methods. For example, a priority queue—much as has been used for Quality of Service (QoS) can be applied to favored data or can be inversely applied to disfavored data. This may prioritize low-utilization data (e.g. emails, text messages, general web browsing, etc.) while disfavoring other data (streaming, operating system updates, etc.). Or, it may disfavor certain users or favor other users to increase the overall positive experience for everyone or for favored users.

In still more granularity, historical data pertaining to a user may be relied-upon. So, for example, a user may initially login to the network to access satellite network resources or the internet. For the first several minutes or perhaps thirty minutes or other predetermined time frame, that "new" user of the system may have their data prioritized. Thereafter, that same user's data may be returned to a "normal" prioritization state. And, after that threshold or still another threshold (e.g. 2 hours), that user's data may be deprioritized to benefit other users.

This makes sense if one considers a use case, for example, on a cruise ship. Users are often doing activities, off of the ship, and many or most users will not spend long periods of time on the ship browsing the internet or otherwise engaged with the internet. Those users may return to their cabin, change clothes, and wish to update their families as to their trip or to upload photos to a social network or the like. Those users will be very unlikely to simply sit in their cabin streaming YouTube® videos. In contrast, a very few users may be unhappy on the cruise or otherwise decide to spend hours and hours on their devices while shipboard. Those user's overuse of data should not cause a detriment to the experience of the more-average or quick-session user. So, in certain situations, new users may be given priority with better bandwidth and accessibility (e.g. through use of QoS flagging of their data or prioritization queues) while longer term users data may be deprioritized. This makes the experience of the short-term users much more productive and allows it to finish faster so that they can return to their other activities. The system may implement this type of "out of specification" activity as identified in step 620, along with other less-beneficial activities.

Similarly, in certain cases, users may pay extra fees or be affiliated with a group (e.g. crew, military, staff, people who paid for certain higher-level accommodations, etc.) that entitles their data to be always treated as high priority or to not be slowed down relative to other's activity. Those users are likewise "out of specification" as identified here.

In response to such a detection, the availability of data to that user is altered at 630. This may be increased availability, decreased availability, or even a change simply for a period of time (e.g. until thirty minutes have elapsed or a certain threshold of other data or activities have completed). Either way, one or more users' data is altered at 630.

Thereafter, a determination is made whether there is a time limit (or other limit) on the alteration at 635. Here, the system may ask whether the prioritization or high priority setting for the data is permanent or temporary and what the limiting factor is. It may be time, it may be bandwidth arability, it may be certain other actions have taken place (e.g. an advertisement has been viewed or a special payment is made). That setting is input to the system for setting priority of the data.

Then, at 645, the system periodically checks whether that time (or other limitation) has elapsed or been met. If so ("yes" at 645), then the availability is altered again at 630, this time returning to normal or priority. If not ("no" at 645), then the process ends at 695 (with ongoing data transmission at 610) under the altered availability of data until a subsequent periodic check at 645.

Figure 7:
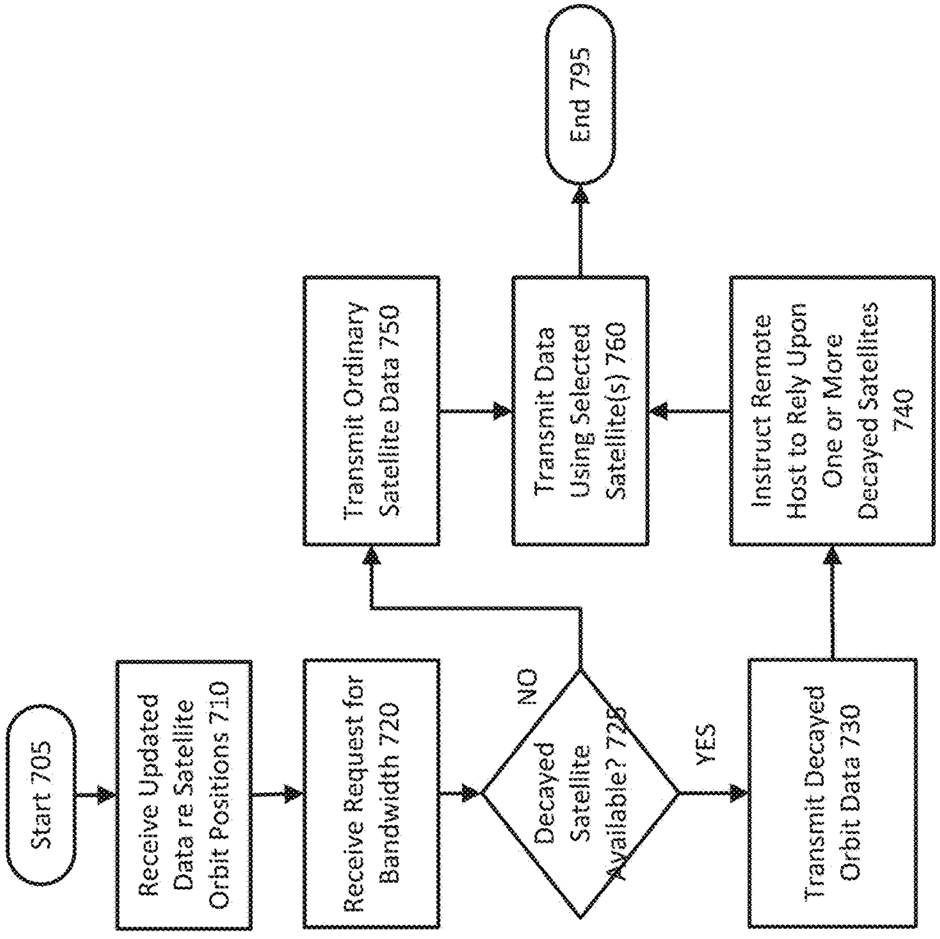
FIG. 7 is a flowchart of a process for transition to and user of link aggregation.

FIG. 7 is a flowchart of a process for transition to and user of link aggregation. The process has a start 705 and an end 795 but may repeat for numerous link aggregation processes. This process generally relies upon the utilization of less-than-desirable satellites with, for example, decaying orbits or undesirable footprints which result in signal degradation. The throughput or capabilities of the individual link may be poor, but links may be aggregated or multiple individual links may be grouped with better-working links to more than adequately service one or more remote hosts. And, the benefit is that many of these kinds of links are significantly less expensive than the high quality links without these kinds of issues.

After the start 705, the process begins with receipt of updated data regarding satellite orbit positions at 710. This is an ongoing and repeated step. Link aggregation, and indeed connecting to these satellites at all, requires precisely updated data about the degradation of their orbits or their positions. Because their orbits may be irregular (e.g. the satellite moving in and out of an ordinary, desirable orbit, the system must continuously be updated to reflect the position of the satellite in order to use it or to combine its link with other available links.

Next, a receipt for bandwidth is received. This may be as simple as a single ship or plane or other remote host coming online for the day or may be a need for more bandwidth to accommodate high usage or utilization.

Next, as a part of that process which may also involve ordinary satellites available, the system may check for a decayed satellite availability at 725. If a decayed satellite is available and its throughput is adequate, that may provide sufficient bandwidth to meet the need identified in 720.

If there is a decayed satellite available ("yes" at 725), then the data pertaining to that satellites orbit is sent to the remote host(s) and to the ground transport station at 730 to enable both systems to rely upon the decayed satellite. Here, a decayed satellite is named, meaning it has a decayed orbit, but it may simply be a less-desirable satellite orbit or a satellite with limited functionality (e.g. non-functioning or under-functioning transponders limiting channel availability or the like).

As discussed briefly above, the typical less-desirable satellite is one near the end of its useful life. Such satellites' orbits can fluctuate with limited fuel (typically compressed oxygen) to adjust the satellite's orbit, as it moves slightly naturally, to maintain a consistent position. Without a consistent position in orbit, transmissions reliant upon the satellite can become inefficient (e.g. requiring rebroadcast to be received). However, the system herein can use historical and predictive data to determine where such a less-desirable satellite may be positioned at any given time and periodically or in real-time instruct satellite antennas of remote hosts or terrestrial transport stations as to the proper location where to transmit and receive signals using such satellites. The expense to gain access to such satellites is typically much less expensive, because their effective bandwidth is often less than those with regular orbits. However, several such satellites sometimes can be joined (e.g. link aggregated) to accomplish what one high-quality satellite connection could otherwise accomplish.

Then, the remote host and terrestrial transport are instructed to rely upon the one or more decayed satellites at 740. This reliance may be in addition to or in replacement of any non-decayed satellites previously used or used simultaneously with the decayed satellite(s). In this sense, it is a link aggregation, reliant upon multiple links to provide sufficient bandwidth to the system. Importantly, this reliance depends upon accurate information regarding the peculiarities of the orbit of the decayed or otherwise undesirable satellite.

If a decayed satellite is not available ("no" at 725), then ordinary satellite data is transmitted instead at 750, which may be a simple identification of the location of that satellite, and the ordinary parameters required to communicate using that satellite.

Thereafter, data is transmitted using the selected satellite(s) at 760 and the process ends at 795.

Figure 8:
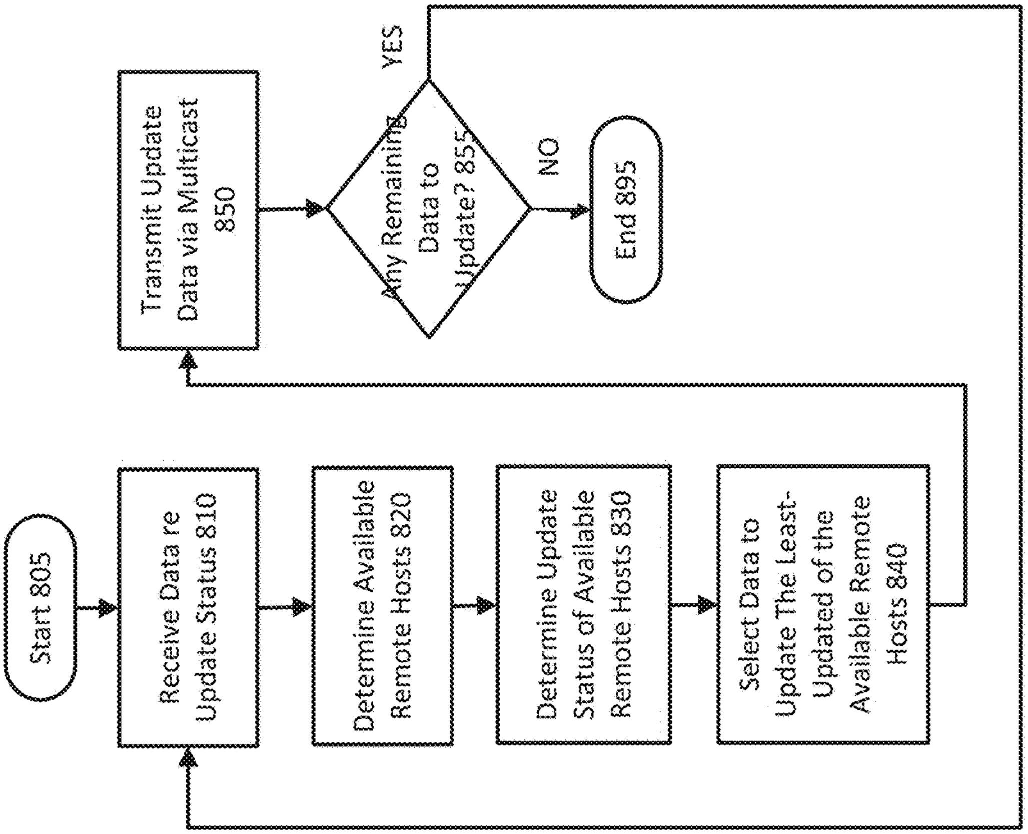
FIG. 8 is a flowchart of a process for multicast data transmission.

FIG. 8 is a flowchart of a process for multicast data transmission.

The process has a beginning at 805 and an end at 895. The process may take place many times over to result in transmission of all multicast, large data sets.

Following the start at 805, the process begins with receipt of data regarding update status at 810. This data identifies the state of large data transfers to a plurality of remote hosts. So, for example, an entire fleet of 600 planes may need to receive the newest set of films which have been licensed to an in-flight wireless and entertainment provider. Or, a similar process may take place for a group of cruise ships or yachts. The update status received at 810 will indicate, potentially down to the individual bits or bytes, which portions of the newest set of films have been received by which of the fleet. This update status data may come periodically from each member of the fleet as a window of available data bandwidth becomes available or at predetermined intervals or times. Collectively, this data will indicate which portions of the set of films (or other data) are least-present in the fleet. Because these large data sets are identical across the fleet, it is preferrable to transmit most (or all) of these data sets in a multicast fashion to as much of the fleet as possible at a given time.

Next, the system determines the available remote hosts at 820. Here, the system detects which of the remote hosts which have reported their update status at 810 are presently available to receive a multicast broadcast. Available to receive means that they have connectivity that could be reached by a multicast broadcast to a plurality of the remote hosts. So, for example, for planes this means that the plane is in the air above 10,000 feet because FCC regulations require planes to disable their satellite antenna below 10,000 feet. For ships, this means within a footprint of a satellite. For any remote host, it means not having data utilization above a predetermined threshold (e.g. 80% or having space for 1 Mb/s of data throughput or the like) so that the multicast broadcast has "room" to be received by the remote host.

One the available remote hosts are determined at 820, then the update status of the available remote hosts is determined at 830. This is a cross-check of the overall update status and the available remote hosts to determine of those available, what data set will be most-beneficial to remote broadcast. This data set can be broad (e.g. a particular film or update data set). Or, it may be narrow (e.g. which particular bytes of data of the intended data storage for such data have not yet been received by the most of the available remote hosts).

Next, the data to be updated via multicast to the available remote hosts is selected at 840. This may be a queue of update data starting with the least-present in the available remote hosts and moving to the most-present. In this way, over time, the least-present data of these large update datasets will be filled-in and the overall completeness of the data transfer or update will grow the most by filling in the most-missing gaps in that data set in the most available remote hosts at the same time. This likewise maximizes the use of the available bandwidth to best-use the available data for the most update possible.

The selected data is then transmitted via multicast at 850. This may be a single large dataset that no remote host has or few remote hosts have, or may work through a queue of least- to most-received data sets to fill in the most-prevalent gaps in the data.

A determination is made at 855 whether there is any remaining data to update at 855. If so ("yes" at 855), then the process continues to and restarts at 810 with receipt of data regarding the update status from remote hosts. If there is no remaining data ("no" at 855), then the process ends at 895.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A network management system for use with a software defined radio for a mobile network system, the network management system comprising:

a plurality of satellite transponders, each satellite transponder operating using single channel per carrier (SCPC) transmission to allocate an entire bandwidth of a given frequency channel of a plurality of channels to the network management system;

at least one ground station in communication with the plurality of satellite transponders, the at least one ground station communicating on at least one of the plurality of channels, using the plurality of satellite transponders, to a remote host;

a management server, comprising a computing device, the management server for:

setting a single channel per carrier bandwidth available for a particular channel of the plurality of channels at a predetermined maximum; and dynamically adjusting the single channel per carrier bandwidth allocated to the particular channel of the plurality of channels based upon a present determination of a utilization of the particular channel of the plurality of channels:

wherein the management server is further for:

maintaining a database of a plurality of large data sets having portions of the large data sets transmitted to a plurality of remote hosts;

detecting which of the plurality of remote hosts have which of the portions of the large data sets and which of the portions have not yet been received by the plurality of remote hosts;

selecting a first of the portions of the plurality of large data sets to be simultaneously transmitted using the plurality of satellite transponders to the plurality of remote hosts using a multicast protocol so as to maximize that the first of the portions of the plurality of large data sets is absent in a largest number of the plurality of remote hosts which are accessible to data transmitted by the plurality of satellite transponders; and wherein the management server is further for:

detecting that the remote host is transitioning out of a geographic area serviced by the particular channel;

selecting a new transponder of the plurality of the satellite transponders;

transitioning the remote host to the new transponder of the plurality of satellite transponders by instructing the new transponder and the remote host to begin transmission on the new transponder at a predetermined time, providing the remote host with the location of the new transponder so as to adjust an antenna from the at least one of the plurality of satellite transponders to the new transponder, and providing the remote host with a new channel on the new transponder, the new channel being a single channel per carrier transmission; and the antenna acquiring a signal and beginning communication using the new transponder in less than two seconds using the new channel.

2. The network management system of claim 1 wherein the management server is further for dynamically adjusting the size, total number of transponders allocated to the particular channel or dynamically selecting more, or fewer of the plurality of transponders for use by the remote host based upon at least one of: the available transponders covering a geographic area serviced by the plurality of satellite transponders, the utilization of the particular channel of the plurality of channels, the utilization of the plurality of channels relative to the particular channel, the utilization of a total of available bandwidth across the plurality of transponders that is utilized by a plurality of hosts including the remote host, movement of the remote host into or out of the geographic area serviced by the plurality of satellite transponders, and movement of other remote hosts into or out of the geographic area serviced by the plurality of satellite transponders.

3. The network management system of claim 1 wherein the management server is further for:

detecting a usage type for data of at least one user of a plurality of users or a particular user reliant upon the remote host; and altering a bandwidth available to the at least one of a plurality of users to increase or decrease the bandwidth available in response to: the usage type being an unpreferred usage type, the usage type being a preferred usage type, the user being associated with inefficient user of available bandwidth, the user being associated with a priority user group, the usage type being a forbidden for use on a network controlled by the network management system, a determination that the usage type has been high-bandwidth utilization for a duration exceeding a predetermined threshold or during a predetermined time period during which bandwidth usage must be managed.

4. The network management system of claim 1 wherein the management server is further for:

allocating bandwidth on one or more transponders of the plurality of transponders on a satellite with an irregular orbit; and providing to the remote host data sufficient to continually adjust an antenna suitable for communication with the satellite with the irregular orbit to maintain a degraded connection to the satellite with the irregular orbit for use by the remote host.

5. The network management system of claim 1 wherein the management server is further for selecting disconnecting the remote host from the particular channel upon detection of conditions selected from a group consisting of: descending or ascending to a predetermined distance from ground; and entering a particular airspace or jurisdiction in which use of the channel or access to a network using the network management system is prohibited.

6. A method for managing a satellite network used with mobile remote hosts, the method comprising:

allocating a plurality of satellite transponders for use in conjunction with the mobile remote hosts, each satellite transponder operating using single channel per carrier (SCPC) transmission to allocate the entire bandwidth of a given frequency channel of a plurality of channels to the network management system;

transmitting data using at least one ground station in communication with the plurality of satellite transponders, the at least one ground station communicating on at least one of the plurality of channels, using the plurality of satellite transponders, to at least one of the mobile remote hosts;

setting a single channel per carrier bandwidth available for a particular channel of the plurality of channels at a predetermined maximum;

dynamically adjusting the single channel per carrier bandwidth allocated to the particular channel of the plurality of channels based upon a present determination of a utilization of the particular channel of the plurality of channels;

maintaining a database of a plurality of large data sets having portions of the large data sets transmitted to a plurality of remote hosts;

detecting which of the plurality of remote hosts have which of the portions of the large data sets and which of the portions have not yet been received by the plurality of remote hosts;

selecting a first of the portions of the plurality of large data sets to be simultaneously transmitted using the plurality of satellite transponders to the plurality of remote hosts using a multicast protocol so as to maximize that the first of the portions of the plurality of large data sets is absent in a largest number of the plurality of remote hosts which are accessible to data transmitted by the plurality of satellite transponders;

detecting that the remote host is transitioning out of a geographic area serviced by the particular channel;

selecting a new transponder of the plurality of the satellite transponders;

transitioning the remote host to the new transponder of the plurality of satellite transponders by instructing the new transponder and the remote host to begin transmission on the new transponder at a predetermined time, providing the remote host with the location of the new transponder so as to adjust an antenna from the at least one of the plurality of satellite transponders to the new transponder, and providing the remote host with a new channel on the new transponder, the new channel being a single channel per carrier transmission; and acquiring a signal and beginning communication using the new transponder in less than two seconds using the new channel.

7. The method of claim 6 further comprising dynamically adjusting the size or total number of transponders allocated to the particular channel or dynamically selecting more or fewer of the plurality of transponders for use by the at least one of the remote hosts based upon at least one of: the available transponders covering a geographic area serviced by the plurality of satellite transponders, the utilization of the particular channel of the plurality of channels, the utilization of the plurality of channels relative to the particular channel, the utilization of a total of available bandwidth across the plurality of transponders that is utilized by a plurality of hosts including the remote host, movement of the remote host into or out of the geographic area serviced by the plurality of satellite transponders, and movement of other remote hosts into or out of the geographic area serviced by the plurality of satellite transponders.

8. The network management system of claim 1 wherein the single channel per carrier bandwidth allocated does not rely upon time-based multiplexing.

9. The network management system of claim 1 wherein the single channel per carrier is broadcasting at all times.

10. The method of claim 6 further comprising:

detecting a usage type for data of at least one user of a plurality of users or a particular user reliant upon the remote host; and altering a bandwidth available to the at least one of a plurality of users to increase or decrease the bandwidth available in response to: the usage type being an unpreferred usage type, the usage type being a preferred usage type, the user being associated with inefficient user of available bandwidth, the user being associated with a priority user group, the usage type being a forbidden for use on a network controlled by the network management system, a determination that the usage type has been high-bandwidth utilization for a duration exceeding a predetermined threshold or during a predetermined time period during which bandwidth usage must be managed.

11. The method of claim 6 further comprising:

allocating bandwidth on one or more transponders of the plurality of transponders on a satellite with an irregular orbit; and providing to the at least one of the remote host data sufficient to continually adjust an antenna suitable for communication with the satellite with the irregular orbit to maintain a degraded connection to the satellite with the irregular orbit for use by the at least one of the remote hosts.

12. The method of claim 6 further comprising selecting disconnecting the at least one of the remote hosts from the particular channel upon detection of conditions selected from a group consisting of: descending or ascending to a predetermined distance from ground; and entering a particular airspace or jurisdiction in which use of the channel or access to a network using the network management system is prohibited.

13. Apparatus comprising non-volatile machine-readable storage medium storing a program having instructions which when executed by a processor will cause the processor to:

allocate a plurality of satellite transponders for use in conjunction with mobile remote hosts, each satellite transponder operating using single channel per carrier (SCPC) transmission to allocate the entire bandwidth of a given frequency channel of a plurality of channels to the network management system;

transmit data using at least one ground station in communication with the plurality of satellite transponders, the at least one ground station communicating on at least one of the plurality of channels, using the plurality of satellite transponders, to at least one of the mobile remote hosts;

set a single channel per carrier bandwidth available for a particular channel of the plurality of channels at a predetermined maximum; and dynamically adjust the single channel per carrier bandwidth allocated to the particular channel of the plurality of channels based upon a present determination of a utilization of the particular channel of the plurality of channels;

maintain a database of a plurality of large data sets having portions of the large data sets transmitted to a plurality of remote hosts;

detect which of the plurality of remote hosts have which of the portions of the large data sets and which of the portions have not yet been received by the plurality of remote hosts;

select a first of the portions of the plurality of large data sets to be simultaneously transmitted using the plurality of satellite transponders to the plurality of remote hosts using a multicast protocol so as to maximize that the first of the portions of the plurality of large data sets is absent in a largest number of the plurality of remote hosts which are accessible to data transmitted by the plurality of satellite transponders; and detect that the remote host is transitioning out of a geographic area serviced by the particular channel;

select a new transponder of the plurality of the satellite transponders;

transition the remote host to the new transponder of the plurality of satellite transponders by instructing the new transponder and the remote host to begin transmission on the new transponder at a predetermined time, providing the remote host with the location of the new transponder so as to adjust an antenna from the at least one of the plurality of satellite transponders to the new transponder, and providing the remote host with a new channel on the new transponder, the new channel being a single channel per carrier transmission; and acquire a signal and begin communication using the new transponder in less than two seconds using the new channel.

14. The apparatus of claim 13 wherein the instructions will further cause the processor to dynamically adjust the size or total number of transponders allocated to the particular channel or dynamically select more or fewer of the plurality of transponders for use by the at least one of the remote host based upon at least one of: the available transponders covering a geographic area serviced by the plurality of satellite transponders, the utilization of the particular channel of the plurality of channels, the utilization of the plurality of channels relative to the particular channel, the utilization of a total of available bandwidth across the plurality of transponders that is utilized by a plurality of hosts including the remote host, movement of the remote host into or out of the geographic area serviced by the plurality of satellite transponders, and movement of other remote hosts into or out of the geographic area serviced by the plurality of satellite transponders.

15. The apparatus of claim 13 wherein the instructions will further cause the processor to:

detect a usage type for data of at least one user of a plurality of users or a particular user reliant upon the remote host; and alter a bandwidth available to the at least one of a plurality of users to increase or decrease the bandwidth available in response to: the usage type being an unpreferred usage type, the usage type being a preferred usage type, the user being associated with inefficient user of available bandwidth, the user being associated with a priority user group, the usage type being a forbidden for use on a network controlled by the network management system, a determination that the usage type has been high-bandwidth utilization for a duration exceeding a predetermined threshold or during a predetermined time period during which bandwidth usage must be managed.

16. The apparatus of claim 13 wherein the instructions will further cause the processor to:

allocate bandwidth on one or more transponders of the plurality of transponders on a satellite with an irregular orbit; and provide to the at least one of the remote host data sufficient to continually adjust an antenna suitable for communication with the satellite with the irregular orbit to maintain a degraded connection to the satellite with the irregular orbit for use by the at least one of the remote hosts.

17. The apparatus of claim 13 wherein the instructions will further cause the processor to select disconnecting the at least one of the remote hosts from the particular channel upon detection of conditions selected from a group consisting of: descending or ascending to a predetermined distance from ground; and entering a particular airspace or jurisdiction in which use of the channel or access to a network using the network management system is prohibited.

18. The apparatus of claim 13 further comprising:

the processor; and a memory, wherein the processor and the memory comprise circuits and software for performing the instructions on the storage medium.

* * * * *